United States Patent
Gao et al.

(10) Patent No.: US 9,723,144 B1
(45) Date of Patent: Aug. 1, 2017

(54) UTILIZING PREDICTIVE MODELS TO IMPROVE PREDICTIVE DIALER PACING CAPABILITIES

(71) Applicant: Noble Systems Corporation, Atlanta, GA (US)

(72) Inventors: Shang Gao, Atlanta, GA (US); Patrick M. McDaniel, Atlanta, GA (US)

(73) Assignee: Noble Systems Corporation

( * ) Notice: Subject to any disclaimer, the term of this patent is extended or adjusted under 35 U.S.C. 154(b) by 0 days.

(21) Appl. No.: 15/270,425

(22) Filed: Sep. 20, 2016

(51) Int. Cl.
*H04M 3/00* (2006.01)
*H04M 5/00* (2006.01)
*H04M 3/51* (2006.01)
*H04M 3/523* (2006.01)

(52) U.S. Cl.
CPC ....... *H04M 3/5158* (2013.01); *H04M 3/5238* (2013.01)

(58) Field of Classification Search
CPC .......................... H04M 3/5158; H04M 3/5238
USPC .......................... 379/265.08, 265.09, 265.01
See application file for complete search history.

(56) References Cited

U.S. PATENT DOCUMENTS

| 5,155,763 | A | 10/1992 | Bigus et al. | |
|---|---|---|---|---|
| 7,110,526 | B1 | 9/2006 | Dezonno | |
| 8,675,839 | B1* | 3/2014 | Noble, Jr. ........... | H04M 3/5175 379/112.08 |
| 2005/0216426 | A1 | 9/2005 | Weston et al. | |
| 2015/0381809 | A1* | 12/2015 | Fleming .............. | H04M 3/5158 379/265.11 |
| 2016/0048766 | A1 | 2/2016 | McMahon et al. | |

OTHER PUBLICATIONS

"A Beginner's Tutorial for Restricted Boltzmann Machines," http://deeplearning4j.org/restrictedboltzmannmachine.html, available as Apr. 7, 2014 according to Internet Archive.
"A comparison of numerical optimizers for logistic regression," Minka, Thomas P., Oct. 22, 2003 (revised Mar. 26, 2007).
"Logistic Regression for Machine Learning," Brownlee, Jason, http://machinelearningmastery.com/logistic-regression-for-machine-learning/, Apr. 1, 2006.
"Maximum Likelihood Estimation of Logistic Regression Models: Theory and Implementation," Czepiel, Scott A., http://czep.net/stat/mlelr.pdf, available as of Feb. 5, 2005 according to Internet Archive.
"Review of Input Variable Selection Methods for Artifical Neural Networks," May et al., Apr. 11, 2011.

(Continued)

*Primary Examiner* — Quynh Nguyen

(57) ABSTRACT

Various embodiments of the invention provide methods, systems, and computer-program products for pacing outbound calls placed by a predictive dialer in a contact center. Specifically, an ensemble made up of a global predictive model and a local predictive model is applied to each dialing record found in a plurality of dialing records to provide a probability of an outbound call placed to the dialing record resulting in a live connect. Accordingly, a call pacing hit ratio can then be calculated based on the probability for each of the dialing records and this call pacing hit ratio can be used by a predictive dialer in various embodiments to more accurately pace the placing of outbound calls then by using conventionally derived call pacing hit ratios.

18 Claims, 10 Drawing Sheets

(56) References Cited

OTHER PUBLICATIONS

"Variable Selection Using the caret Packege," Kuhn, Max, Jun. 10, 2010.
"Why Does Unsupervised Pre-Training Help Deep Learning?," Erhan et al., Journal of Machine Learning Research 11, pp. 625-660, Feb. 2010.

* cited by examiner

UTILIZING PREDICTIVE MODELS TO IMPROVE PREDICTIVE DIALER PACING CAPABILITIES

BACKGROUND

Many contact centers originate outbound calls by making use of automated dialing equipment so that they may effectively dial multiple calls virtually simultaneously. Use of such equipment is made because to sequentially place outbound calls as agents become available results in an inefficient use of the agents' time. Firstly, an available agent may have to wait and sit idle while calls are being placed for other agents who have also become available. Secondly, an available agent may have to wait and sit idle until a call reaches a live party (live connect) because a large number of placed calls do not necessarily result in reaching a live party but instead, result in reaching a busy signal, answering machine/service, out-of-service indicator, or continue to ring without ever being connected. Therefore, an agent does not only have to wait for a call to be placed for him, but he also has to wait for a call to be placed for him that reaches a live party.

With that said, automated dialing equipment commonly used by contact centers to dial multiple virtually simultaneous calls is a predictive dialer. Generally speaking, a predictive dialer initiates multiple calls for an agent, not expecting all of the calls to reach a live party. Instead, the predictive dialer expects at least one of the calls to reach a live party so that this call can be connected with the agent. In turn, the predictive dialer filters out the remaining calls that do not reach live parties so that such calls are not forwarded to agents. As result of using a predictive dialer, agents' time is more effectively utilized handling calls that have reached live parties, with minimal idle time between handling such calls.

In many instances, a predictive dialer employs an algorithm (often referred to as a "pacing" algorithm) for determining when and how many outbound calls should be originated at any given time. Ideally, this algorithm cannot originate outbound calls too slowly so as to keep agents waiting idle for too long before being connected to a call. However, this algorithm also cannot originate outbound calls too quickly so as to cause no agents to be available when an outbound call is connected to a live party. Thus, the algorithm often employs various techniques and variables to determine the optimal pacing of outbound call origination and the number of calls to originate under the current circumstances.

One of the key variables used by many pacing algorithms in determining the number of outbound calls to originate is call pacing hit ratio. Call pacing hit ratio is the percentage of outbound calls that are expected to result in a live connect (e.g., a human picking up the phone), as opposed to some other outcome such as, for example, a busy signal, an answering service/machine answering the call, or no answer. Conventionally, a pacing algorithm determines/predicts the expected call pacing hit ratio for outbound calls to be placed for a given time by simply averaging the hit ratio over a number of past dials performed for some past period of time. Such a determination can work well if the contact center is dialing outbound calls for dialing records of the same type as the dialing records for the past dials used to determine the average hit ratio. However, in many instances, this is not the case. Instead, if the current dialing records to be dialed vary greatly from the dialing records for the past dials used to determine the average hit ratio, then the expected hit ratio can be inaccurate and this can lead to the predictive dialer ineffectively originating calls for agents. Thus, a need in the industry exists for predicting call pacing hit ratio more accurately than conventional methods. A more accurate call pacing hit ratio can lead to higher predictive dialer efficiency and performance over call pacing hit ratios determined using conventional methods. It is with respect to these and other considerations that the disclosure herein is presented.

BRIEF SUMMARY

In general, embodiments of the present invention provide computer-program products, methods, systems, apparatus, and computing entities for utilizing predictive models in pacing outbound calls placed by a predictive dialer in a contact center. In various embodiments, an ensemble of predictive models is applied to each dialing record found in a plurality of dialing records to provide a probability of an outbound call placed to the dialing record resulting in a live connect. In particular embodiments, this ensemble is made up of a global predictive model representing comprehensive dialing trends across at least one of multiple industries, purposes, locations, and predictive dialers and a local predictive model representing a specific dialing history associated with the contact center. For instance, in a particular embodiment, the ensemble may comprise a logistic regression model based on combining the global and local predictive models and these predictive models may both be neural networks.

Accordingly, a call pacing hit ratio may then be calculated in various embodiments based on the probability for each of the dialing records, wherein this call pacing hit ratio represents a percentage of outbound calls expected to result in a live connect. For instance, in particular embodiments, the call pacing hit ratio may be calculated by averaging the probabilities across the plurality of dialing records and multiplying the average by the number of dialing records found in the plurality of dialing records.

Thus, in various embodiments, a predictive dialer can then use this call pacing hit ratio to determine a number of outbound calls to place at a given time. For instance, in particular embodiments, the predictive dialer uses the call pacing hit ratio in conjunction with at least one of a number of agents associated with the contact center that are currently available to handle calls and a number of agents associated with the contact center that are expected to become available to handle calls within a time period to determine the number of outbound calls to place at the given time. As a result, the predictive dialer is able to more accurately pace the placing of outbound calls in various embodiments by using this call pacing hit ratio than by using conventionally derived call pacing hit ratios.

As is discussed in greater detail below, the subject matter disclosed herein may be implemented as a computer-controlled apparatus, a method, a computing system, or an article of manufacture such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Figure 1:
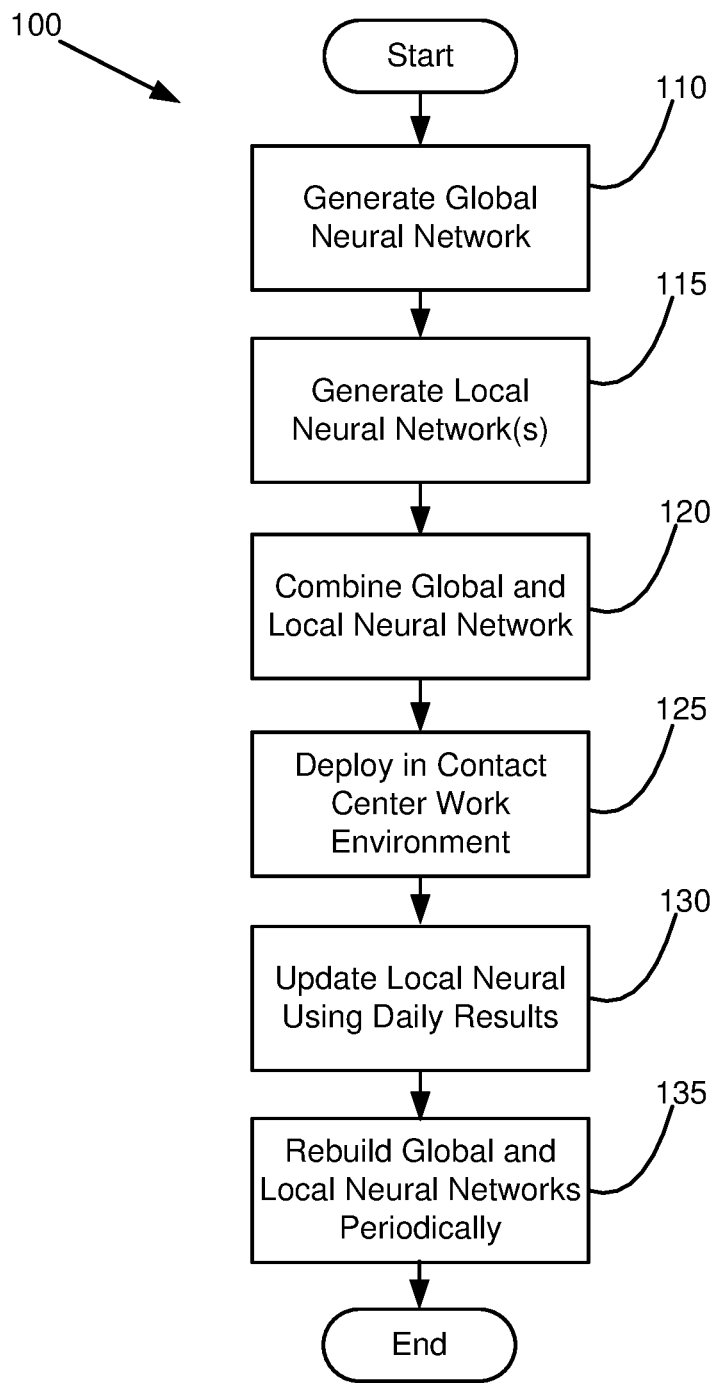
FIG. 1 illustrates an embodiment of a process flow for utilizing neural networks to improve predictive dialer capabilities in accordance with various technologies and concepts disclosed herein.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

General Overview

Various embodiments of the invention are concerned with utilizing predictive models to improve determination of call pacing hit ratios and in turn, improve predictive dialer efficiency and performance. A key factor in determining a predictive dialer's performance is how well the predictive dialer is originating outbound calls to effectively utilize agents' time and maximize agent productivity. Therefore, a predictive dialer originates outbound calls based on the number of agents currently available and/or the number of agents expected (predicted) to become available in the time that the calls reach live parties. The ideal setting for the predictive dialer is to originate enough calls so that as each agent becomes available to handle a call, such a call has been placed and has reached a live party, and is ready for the agent to handle with minimal idle time.

Accordingly, a simplistic solution to maximize agent productivity is for the predictive dialer to initiate as many calls as possible, and disconnect any calls answered by a live party if an agent is unavailable. These disconnected calls answered by a live party are referred to as dropped calls (abandoned calls). However, this mode of operation is largely viewed as a nuisance because it results in a number of called parties rushing to answer their phone only to then have the predictive dialer disconnect the call if an agent is not available. As a result, federal regulations have been put into place to limit the percentage of such abandoned calls. Therefore, the predictive dialer's performance is not only tied to how well the dialer is maximizing agent productivity but is also tied to how well the dialer is maximizing agent productivity while minimizing abandoned calls.

As previously mentioned, a key variable used by the predictive dialer in determining the number of outbound calls that should be originated at any given time is call pacing hit ratio. That is to say, call pacing hit ratio plays a key role in determining how many calls the dialer should place at any given time and/or how many agents need be available at any given time. For instance, suppose the predictive dialer determines twenty-six agents will be available to handle calls in the next five seconds and the expected call pacing hit ratio is twenty percent. An expected call pacing hit ratio of twenty percent indicates that for every ten outbound calls placed, two of the call are expected to reach live parties. Therefore, the predictive dialer would then determine that it needs to originate one-hundred and thirty calls to have calls with live parties available for the twenty-six agents in the next five seconds.

Minimizing the degree of error (e.g., providing a high degree of accuracy) in determining the expected call pacing hit ratio becomes vital in ensuring the predictive dialer is operating with optimal efficiency and performance. For example, although the expected call pacing hit ratio is determined to be twenty percent, the actual number of calls answered by live parties may be more like thirty percent. Therefore, if the predictive dialer originates one-hundred and thirty calls and thirty-nine of the calls are actually answered by live parties, then a strong possibility exists that calls will be answered by a live party for which there are no available agents to handle the calls. Conversely, if the actual number of calls answered by live parties is only fifteen percent instead of twenty percent, then a strong possibility exists that agents will remain idle for a period of time that is considered highly detrimental to agents' overall efficiencies. Thus, an accurate determination of the expected call pacing hit ratio is important in ensuring maximizing agent productivity while also minimizing dropped calls to an acceptable level.

As previously mentioned, the conventional practice often followed for predicting the expected call pacing hit ratio is to simply average the hit ratio over a past number of dials and/or past period of time. However, this practice works well only if the predictive dialer is dialing the same types of records (e.g., homogeneous records). Thus, the hit ratio may become quite inaccurate if the predictive dialer is dialing records that vary greatly in type among themselves (e.g., heterogeneous records). For example, an expected call pacing hit ratio determined by averaging the hit ratio over a past number of dials may be accurate when the past number of dials are all related to records for calls placed to individuals living in the same area code during a similar time of day. However, determining the call pacing hit ratio by averaging the hit ratio over a past number of dials becomes a lot less reliable when the past number of dials are related to records for calls placed to individuals living in multiple area codes and/or during different times of the day.

Therefore, a mechanism is needed that provides an expected call pacing hit ratio with a high degree of accuracy, even when the records used to predict the expected call pacing hit ratio and the records associated with calls to be placed vary greatly by type. With this in mind, various embodiments of the invention involve a predictive dialer making use of machine learning (also known as a predictive model) to achieve a high degree of accuracy in determining call pacing hit ratio. Generally speaking, machine learning (predictive model) is concerned with the construction and study of systems (e.g., computers) that can learn from data and then predict based on learned behavior. The core of machine learning deals with representation and generalization. That is to say, a core objective of a learning machine is to generalize from its experience. Generalization is the ability of the learning machine to perform accurately on new, unseen instances after having experienced a training dataset comprising instances with known outcomes. Thus, a learning machine focuses on providing predictions based on known properties learned from a training dataset.

Several types of learning machines (predictive models) exist and may be applicable with respect to embodiments of the invention. For instance, a decision tree uses a tree-like graph or model of decisions (flowchart-like structure) to map observations about an item to conclusions about the item's target value. In general, the flowchart-like structure is made up of internal nodes representing tests on attributes and branches flowing from the nodes representing outcomes to these tests. The internal nodes and branches eventually lead to leaf nodes representing class labels. Accordingly, a path from a root to a leaf represents classification rules.

Another type of learning machine is a support vector machine (SVM). SVMs are generally a set of related supervised learning methods that can be used for classification purposes. That is to say, SVMs are generally used to classify an instance into one class or another. Given a set of training examples, each marked as belonging to one of two categories (e.g., classes), a SVM training algorithm builds a model that predicts whether a new sample falls into one of the two categories.

There are countless other types of learning machines (predictive models), such as Bayesian networks, clustering, and reinforcement learning to name a few, that one of ordinary skill in the art may make use of with respect to various embodiments of the invention. However, with respect to the embodiments of the invention described below, the type of learning machine (predictive model) utilized is a neural network.

An artificial neural network is a learning algorithm inspired by the structure and functional aspects of biological neural networks. Computations are structured in terms of an interconnected group of artificial neurons, processing information using a connectionist approach to computation. Artificial neural networks are typically used to model complex relationships between inputs and outputs to find patterns in data or to capture a statistical structure in an unknown joint probability distribution between observed variables.

Turning now to FIG. 1, a general process flow is provided for developing and using a neural network in a contact center work environment to predict call pacing hit ratios in real-time in order to determine the number of outbound calls a predictive dialer should originate at any given time. Here, the process 100 begins with generating a global neural network in Step 110. As is provided in further detail below, this particular step involves generating a neural network to predict whether a particular record in a calling list will result in reaching a live connect. Note that the term "live connect" is used because in some instances a contact center may consider reaching an additional outcome, such as an answering machine or service, to be a successful connect in addition to reaching a live person. For instance, a contact center may be placing outbound calls for the purpose of providing a personalized message to the party being called. In this instance, the contact center plans to provide the personalized message to either a live person who has answered a call or on an answering machine/service that has answered the call. Therefore, the contact center wishes to have calls answered by a live person or an answering machine/service forwarded to an agent to handle. Accordingly, the neural network is generated in this instance to predict whether a live person or an answering machine/service is likely to answer a call placed for a particular dialing record.

The "global" aspect of the neural network is based on the network being developed using a set of dialing records that includes records representing comprehensive dialing trends across at least one of multiple industries, multiple purposes, multiple locations, and multiple predictive dialers. Thus, in particular embodiments, the set of dialing records are gathered from multiple contact centers who are placing outbound calls possibly using a multitude of different dialing devices, for a multitude of reasons, to a multitude of different places, and at a multitude of different times. Such a diverse set of records allows for the development of a comprehensive predictive solution that can be distributed to a number of different contact centers for use. For example, a manufacturer of a particular type of predictive dialer may develop a global neural network for determining call pacing hit ratios based on dialing records available through a diverse number of the manufacturer's clients (e.g., contact centers using the manufacturer's predictive dialer). The manufacturer may then distribute the developed global neural network to each of its clients to be used by the client in determining call pacing hit ratios during the times it is conducting outbound calling campaigns.

With that said, the next Step 115 in the process 100 involves generating one or more local neural networks. The term "local" is used to identify developing a neural network for a specific dialing history. For instance, in the example involving the predictive dialer manufacturer providing a global neural network to each of its clients, a local neural network is generated for each client using the dialing records from the particular client's dialing history. Therefore, a local neural network model trends in this instance for a specific contact center. While in another instance, the global neural network may represent a contact center's entire dialing history and a local neural network may represent only a dialing history for a specific dialer in the contact center and/or for a specific type of dialing record found in the dialing history. Other combinations of global and local networks may be developed in other embodiments as those of ordinary skill in the art can appreciate in light of this disclosure.

Accordingly, in various embodiments, each local neural network is trained using different features from dialing records that represent the local dialing patterns and call list being modelled by the local neural network. Here, recursive feature elimination with simple neural networks may be used in particular embodiments to select the most relevant features from a pool of available features.

At this point, the global neural network is combined with the local neural network for a particular installation in Step 120 to form an ensemble. Ensemble modeling is the process of running two or more related but different predictive models and then synthesizing the results of each model into a single score to improve the accuracy of predictive analytics. Here, the two different neural networks have been trained on two different sets of data and are then combined. Such a step is performed in various embodiments because research on ensemble theory has shown that combining the predictions from multiple and different models improves overall classification accuracy. Just as in humans, multiple experts can come to a better decision than a single expert, the same holds true in machine learning algorithms.

Different methods of combining the two neural networks can be used depending on the embodiment. For instance, in particular embodiments, logistic regression is used to combine the results from the global neural network and the local neural network. Logistic regression determines the ratio of the two results of the networks that maximizes prediction accuracy. In addition, cross validation may be performed in particular embodiments using the "local" dialing records to select the best parameters (e.g., coefficients) for the logistic regression model. The final combined model of the global and local neural networks can then be used in a contact center work environment to aid in determining expected call pacing hit ratios in real-time.

Thus, in Step 125, the final combined model of the global and local neural networks is deployed in a contact center work environment. Deployment involves placing the model in the process used by the predictive dialer in determining how many outbound calls to originate at any given time to attempt to maximize agents' efficiencies and productivity while also maintaining an acceptable abandonment rate (if required). Three primary variables considered by the predictive dialer during this process include a call list containing the records to dial, agents who are available to handle calls that reach a live connect, and the number of calls to originate. Accordingly, in various embodiments, the predictive dialer makes use of a pacing algorithm that considers the expected call pacing hit ratio along with the number of available agents and records in the call list to dial in determining the number of calls that need to be originated for each available agent at any given time to meet a set target. This set target may be different depending on the contact center's goals and requirements for an outbound calling campaign being conducted.

For instance, the set target may be to maintain an abandonment rate so that only a certain percentage of calls are dropped throughout the campaign. For example, the contact center may be conducting a telemarketing outbound call campaign and must stay compliant with FTC regulations by maintaining a three percent abandonment rate. While in another instance, the set target may be to maintain a time limit on how long a live party should remain on hold before being connected with an agent. Yet in another instance, the set target may be to maintain a maximum wait time agents should wait between calls. Still yet in other instances, the set target may be a combination of objectives such as, for example, maintaining an abandonment rate while also maintaining a maximum wait time agents should wait between calls. Therefore, depending on the set target, the predictive dialer calculates the number of calls to originate for each agent based on the number of available agents and dialing records and the expected call pacing hit ratio while maintaining the set target. This involves the predictive dialer using the combined model to predict the probability of each dialing record in a batch of records resulting in a live connect to calculate a number of records that will result in a live connect. For instance, in one embodiment, the predictive dialer averages the connect probabilities across all of the dialing records in the batch multiplied by the number of records in the batch. This number is then combined with the set target and number of available agents to determine the number of calls that should be originated at any given time (e.g., the number of available records that should be dialed at any given time).

At this point, the contact center may take steps to ensure the model is up to date and maintaining a high level of accuracy. For instance, in particular embodiments, the contact center may update the local neural network using daily results in Step 130. For example, the contact center may take the daily results of the placed outbound calls each night and add the results to the collection of local dialing records and retune the local neural network using stochastic batch gradient descent across the local records with the daily results. This practice of retuning the local neural network is designed to keep the model up-to-date with any new dialing trends.

In addition, in particular embodiments, the contact center (or other entity associated with the neural network(s)) may rebuild both the global neural network and the local neural network periodically in Step 135. For instance, the contact center may rebuild both networks from scratch once a month using a moving dataset of, for example, the past three to six months to train the models. In addition, the contact center may re-perform the process of combining the two neural networks to form the ensemble.

Exemplary Architecture for Contact Center

Figure 2:
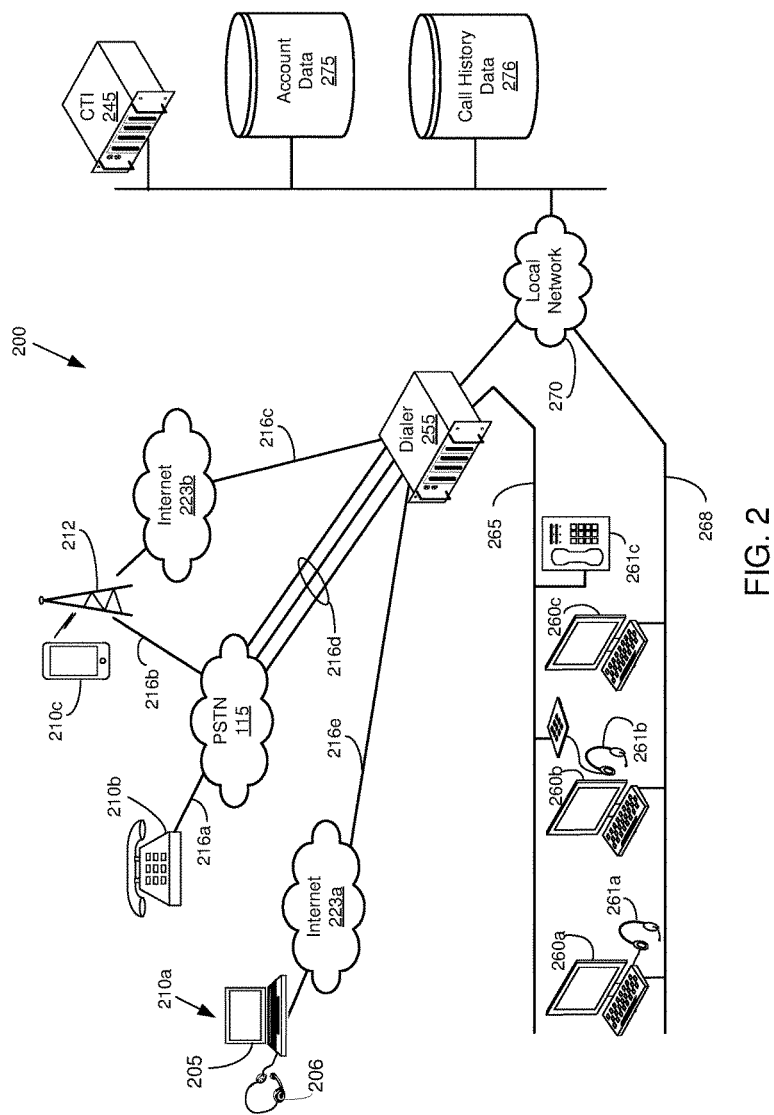
FIG. 2 illustrates an embodiment of an architecture that may be employed in accordance with various technologies and concepts disclosed herein.

FIG. 2 shows one embodiment of a contact center architecture 200 that may be used in accordance with the various technologies disclosed herein. Although many aspects of contact center operation are disclosed in the context of voice calls, the contact center may process other forms of communication such as, for example, facsimiles, emails, text messages, video calls, chat messages, and other forms. The term "party" without any further qualification refers to a live person (as opposed to an answering machine or voice mail service) associated with an instance of communication processed by the contact center.

The contact center shown in FIG. 2 may process voice calls that are originated by a predictive dialer 255. In various embodiments, the predictive dialer 255 is configured to dial one or more lists of telephone numbers to initiate outbound calls. The lists of telephone numbers (e.g., "call lists") generally is compiled of dialing records representing the telephone numbers and may be generated based on a number of accounts stored in some type of storage media 275 that is accessible using a local network 270. In addition, in particular instances, the predictive dialer 255 or some other component within the contact center architecture 200 may retrieve call history information stored in some type of storage media 276 that is used in conjunction with information provided by dialing records found on the call lists.

In particular embodiments, the predictive dialer 255 may directly interface with voice trunks using facilities 216*d* to a public switched telephone network ("PSTN") 115 for originating calls. In these embodiments, a call may be routed by the PSTN 215 and may comprise various types of facilities, including, but not limited to: T1 trunks, SONET based fiber optic networks, ATM networks, PSTN trunks 216*d*, or other facilities 216*e*, 216*c*. Further, depending on the embodiment, after a call is originated and answered by a party, the predictive dialer 255 may connect the call with an agent or place the call in a queue for a next available agent. In the latter case, announcements or music may be provided to the party as the party waits in the queue.

In addition, in various embodiments, the predictive dialer 255 makes use of one or more pacing algorithms to determine how and when to dial a group of numbers so as to minimize the likelihood of a called party being placed in a queue while maintaining effective agent utilization. That is, in particular embodiments, the predictive dialer 255 "dials ahead" by originating more calls than there are available agents, expecting some calls not to be answered by live parties and/or more agents to become available to handle all the answered calls.

Depending on the embodiment, outbound voice calls may originate to parties who are using a variety of different phone types. For instance, a party may receive a call on a conventional analog telephone 210*b* connected to the PSTN 215 using an analog plain old telephone service ("POTS") line 216*a*. A party may also receive a call on a mobile device 210*c*, such as a smart phone or tablet, which wirelessly communicates with a mobile service provider ("MSP") 212. A call to a mobile device 210*c* may be routed from the PSTN 215 using an integrated services digital network ("ISDN") interface 216*b* or other types of interfaces that are well known to those skilled in the art. In addition, the MSP 212 may also route a call to a party that was received as packetized voice, referred to herein as voice-over-IP ("VoIP"), from an Internet provider 223*b* using Internet-based protocols. In turn, the call may have been routed to the Internet provider 223*b* over a trunk 216*c* from the predictive dialer 255. For convenience, unless indicated otherwise, the term "trunk" refers to any type of facility 216*c*, 216*d*, or 216*e* providing voice calls to, or from, the contact center, regardless of the type of protocol or technology used. Specifically, a "trunk," as referred to herein, is not limited to time-division multiplexing ("TDM") technology.

Voice calls may also be received by a party who is employing a so-called "IP phone," "VoIP phone," or "soft phone" 210*a*. In one embodiment, this device may comprise a computing device 205, such as a laptop, desktop, or computing tablet that interfaces with a headphone/microphone combination, also referred to as a "headset" 206. An IP phone may use a digital voice control protocol and may process packetized voice data according to various Internet based voice protocols, such as session initiated protocol ("SIP"). The call may be conveyed by other types of Internet providers 223*a*, such as a cable company providing Internet access services over a coaxial cable facility 216*e*. Those skilled in the art will recognize that a variety of protocols and facilities may be used to convey voice calls.

Once outbound calls have been answered, they may be routed over facilities 265 to agents for servicing. That is, after a call is originated by the predictive dialer 255 and a called party answers, the call may be connected with an agent. The physical area at which the agent sits is often referred to as an agent "position" and these positions are often grouped into clusters that are managed by a supervisor, who may monitor calls and the agents' productivity. According to various embodiments, an agent typically uses a computing device, such as a computer 260*a*-260*c* and a voice device 261*a*-261*c*. In particular embodiments, data may be provided to an agent's workstation computer 260*a*-260*c* over facilities 268 along with routing the call to the agent's workstation voice device 261*a*-261*c* over other facilities 265. The combination of computer 260*a*-260*c* and voice device 261*a*-261*c* may be referred to as a "workstation." Thus, the workstation collectively has a data capability and a voice capability, though separate devices may be used. In some instances, "workstation" may be used in reference to specifically either the data or voice capability at the agent's position, as appropriate to the context. For example, "routing the call to the agent's workstation" means routing a call to a voice device 261*a*-261*c* at the agent's position. Similarly, "routing the call to the agent" means routing a call to the appropriate equipment at an agent's position.

Depending on the embodiment, the voice device used by an agent may be a soft phone device exemplified by a headset 261*a* connected to the computer 260*a*. The soft phone device may be a virtual telephone implemented in part by an application program executing in a computer. The voice device may also comprise an Internet Protocol ("IP") based headset 261*b* or a conventional phone 261*c*. Thus, use of the term "phone" is intended to encompass all these types of voice devices used by an agent.

Further, in various embodiments, a CTI server 245 may be incorporated in the contact center architecture 200 to control, monitor, and/or coordinate other components of the architecture 200. Specifically, the CTI server 245 may interact with the predictive dialer 255 to coordinate call processing. For instance, in particular embodiments, the CTI server 245 may control routing of calls from the predictive dialer 255 to the various agent workstations, may process telephone numbers found on call lists to produce optimal schedules for calling the telephone numbers, may coordinate other forms of communication such as text messages and/or emails, and/or may provide data to other components processing the calls and/or call lists. In addition, in particular embodiments, the CTI server 245 may also monitor various components of the architecture 200. For example, the CTI server 245 may monitor the number of calls made by the contact center and/or monitor the outcome of such calls. Further, the CTI server 245 may also provide call reporting functionality based on data collected during calls such as saving such data as call history.

Although the above components may be variously referred to as a "computer" "processing device," "unit," "component" or "system" and may incorporate therein a local data store or database, or interface with an external database. Use of the word "server" herein does not require the component to interact in a client-server arrangement using web-based protocols with other components, although that may be the case. Further, the above components may be located remotely from (or co-located with) other components. Furthermore, one or more of the components may be implemented on a single processing device to perform the functions described herein.

In addition, the contact center architecture 200 may be provided as a hosted solution in particular embodiments, where the call processing functionality is provided as a communication service (a so-called "communication as a service" or "CaaS") to a contact center operator. Thus, there is no requirement that the components identified above must be actually located or controlled by a contact center operator.

Further, the agent positions can be co-located in a single physical contact center or in multiple physical contact centers. The agents can be remotely located from the other components of the contact center, and may also be remotely located from each other, sometimes referred to as a "virtual contact center." A virtual contact center may describe a scenario where agents work at home, using their own computers and voice devices as workstations. In some configurations, a single physical location of the contact center may not be readily identifiable. This may occur when the call processing functions are provided as a service in a hosted cloud computing environment and the agent positions are in their individual residences.

Those skilled in art will recognize FIG. 2 represents one possible configuration of a contact center architecture 200, and that variations are possible with respect to the protocols, configurations, facilities, technologies, and equipment used. Thus, other variations on the physical configurations are possible.

Artificial Neural Networks

The basic structure of a neural network includes one input layer, one or more hidden layers, and one output layer. The input layer has a number of neurons (nodes) equal to the input parameters. The hidden layer(s) can have any number of nodes. The output layer has nodes equal to the number of possible classifications (in this case, two—live connect or not). The nodes making up the layers of the neural network work in a feedforward fashion and are fully connected to the nodes of the next layer in one direction. Accordingly, the input nodes of the input layer send data via synapses (weights) to the nodes of the second layer, the nodes of the second layer send data via synapse to the nodes of the next layer (e.g., another hidden layer or the outbound layer), and so forth. Therefore, an important aspect of a neural network that influences how well the network is able to perform is the architecture of the network.

The architecture of a neural network specifies what variables are involved in the network and their topological relationships. For instance, some of the variables involved in the network include the weights of the connections between the neurons (nodes) of the network, along with activities of the neurons. The architecture is typically defined by three types of parameters: the interconnection pattern between the different layers of neurons; the learning process for updating the weights of the interconnections; and the activation function that converts a neuron's weighted input to its output activation. The activation function defines the output of a neuron given an input or set of inputs. That is to say, the activation function defines the "firing rate" of the neuron. The behavior of a linear perceptron in a neural network is a network of activation functions that can be either "on" or "off." However, it is the nonlinear activation functions that allow such a network to compute nontrivial problems using only a small number of neurons (nodes).

Accordingly, the activation functions of the network may be any one of several different types depending on the embodiment. For instance, the input layer and/or hidden layer(s) of the neural network may be designed using the sigmoid activation function, which is a mathematical function having an "S" shaped curve (sigmoid curve) and is used to give logistic neurons real-valued output that is a smooth and bounded function of their total input. This function also has the added benefit of having nice derivatives that make learning the weights of a neural network easier. Accordingly, the sigmoid activation function "squashes" real numbers to a range between zero and one. In particular, large negative numbers become zero and large positive numbers become one. On the other hand, the input layer and/or the hidden layer(s) may be designed using the hyperbolic tangent (tanh) activation function, which also "squashes" real numbers, but instead of squashing them to a range between zero and one, the function squashes real numbers to a range of negative one to one and thus is centered around zero.

Other activation functions that may be considered for the input and hidden layers are the rectified linear unit (ReLU) activation function or the leaky ReLU activation function. The ReLU activation function is simply threshold at zero and therefore can be implemented by simply thresholding a matrix of activations at zero in comparison to sigmoid/tanh neurons that involve expensive operations (exponentials, etc.). However, the ReLU activation function can be prone to "die" during training. For example, a large gradient flowing through a ReLU neuron can cause the weights to update in such a way that the neuron will never activate on any data point again, causing the gradient flowing through the neuron to be zero from that point on. The leaky ReLU activation function attempts to fix this problem by having a small negative slope when the input (x) is less than zero instead of being zero.

Finally, the softmax activation function is often implemented at the output layer of a neural network used for classification. This is because by assigning a softmax activation function on the output layer for categorical target variables, the outputs can be interpreted as posterior probabilities, which can be very useful in classification as it gives a certainty measure on classifications. For instance, using the softmax activation function on the output layer of the neural network used for predicting where a particular dialing record will result in a live connect provides a value of a probability of resulting in a live connect and a value of a probability of not resulting in a live connect in which the two probabilities add to one. Thus, the probability values indicate the certainty of the neural network predicting whether or not a particular dialing record will result in a live connect.

As noted, the neural network is primarily made up of an input layer, an output layer, and one or more hidden layers that lie between the input and output layers. As mentioned already, the size of the input layer is typically defined by including a neuron for each input parameter. Similarly, the size of the output layer is typically defined by including a neuron for each possible output classification. However, an important decision with respect to the architecture of the neural network is the number of hidden layers to include in the network and the size of each hidden layer.

Generally speaking, as the number and size of hidden layers increases in a neural network, the capacity of the network increases. That is to say, as the number and size of hidden layers increases, the neural network is able to express more complicated functions. However, increasing the capacity of the neural network can be both beneficial and detrimental to the performance of the network. The reason for this is because the complexity of the neural network architecture can lead to overfitting the training data. Overfitting arises when the capacity of the network significantly exceeds the needed free parameters. That is to say, overfitting arises when the network fits the noise in the training data instead of the underlying relationships and as a result, fails to generalize well in unseen examples. However, with that said, the problem of overfitting the training data is normally addressed using practices such as regularization, dropout, and input noise.

Therefore, establishing the number of hidden layers and size of these layers is not typically driven by a concern for overfitting the training data. Instead, the deciding factor in determining the number of hidden layers to include in the neural network(s) and the size of these hidden layers is time and computational capabilities available in developing and testing the neural network(s). It has been found in practice that in many cases, a neural network having two hidden layers outperforms a neural network with one hidden layer. However, going beyond two hidden layers rarely helps much more.

Figure 3:
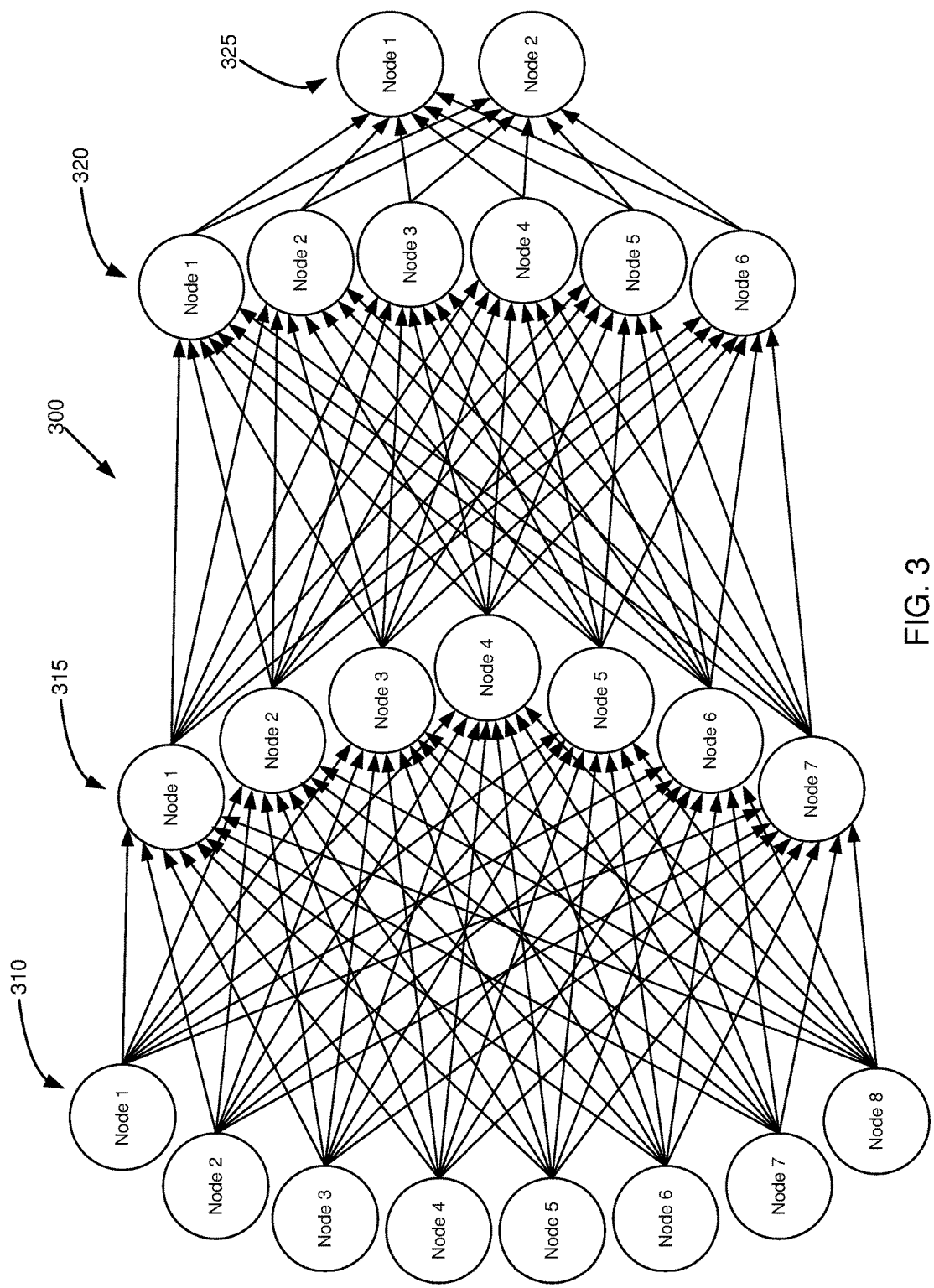
FIG. 3 illustrates a schematic of an embodiment of a neural network.

As for the size of a hidden layer, a general rule of thumb is to include a number of nodes that is between a proceeding layer (e.g., input layer or previous hidden layer) and a following layer (e.g., next hidden layer or output layer). For instance, in particular embodiments, the size of a hidden layer may be set to the mean of the number of nodes in a proceeding layer and a following layer. For example, the input layer for a neural network architecture being designed to predict whether placing a call to a dialing record will result in a live connect may be defined as having eight input parameters, and thus eight nodes. Accordingly, the output layer is defined to have two nodes based on the output from the neural network being either yes, the dialing record will result in a live connect, or no, it will not. Therefore, if the neural network is initially designed to include two hidden layers, then the initial architecture for the neural network may be defined in this example as follows:

Input layer: 8 nodes
$1^{st}$ hidden layer: (8 nodes+2 nodes)/2=5 nodes
$2^{nd}$ hidden layer: (5 nodes+2 nodes)/2=4 nodes
Output layer: 2 nodes In other embodiments, the size of a hidden layer may be set to a number of nodes in a proceeding layer and a following layer, multiplied by two-thirds. Therefore, returning to the example, the initial architecture for the neural network may be defined as follows:

Input layer: 8 nodes
$1^{st}$ hidden layer: (8 nodes+2 nodes)*2/3=7 nodes
$2^{nd}$ hidden layer: (5 nodes+2 nodes)*2/3=6 nodes
Output layer: 2 nodes The architecture of such a neural network 300 is shown in FIG. 3. As one can see, the input layer 310 of the network has eight nodes connected to a first hidden layer 315 of seven nodes. In turn, the seven nodes in the first hidden layer 315 are connected to a second hidden layer 320 of six nodes. Finally, the six nodes in the second hidden layer 320 are connected to an output layer 325 of two nodes. Other configurations may be used and/or the architecture of the neural network 300 may be modified in various embodiment based on factors such as, for example, the modeler's experience and/or the results of testing the current architecture of the neural network 300.

Exemplary System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Identify Input Variables Module

An important aspect in implementing a neural network (or any other type of predictive model for that matter) is identifying the variables to use as inputs into the network. This is because the choice of input variables is a fundamental consideration in identifying the optimal functional form of the network. That is to say, the impact that the choice of input variables has on the network's performance is considerable. For instance, the selection of too few a number of variables often leads to a poorly performing model because the likelihood of having variables that are not sufficiently informative is increased, leading to some of the behavior of the output remaining unexplained by the selected input variables. However conversely, the effect of selecting too large a number of variables can also often lead to a poorly performing model because the likelihood of inclusion of redundant and irrelevant input variables is increased, leading to an overly complex model with noise.

Here, the task of selecting the input variables for both the global and local neural networks is largely dependent on discovering relationships within a number of available variables found in the dialing records that identify suitable predictors of whether a call placed to a particular dialing record is expected to result in a live connect. However, the difficultly in selecting appropriate input variables can arise due to the number of variables available in the dialing records, which may be large, correlations between potential input variables, which recreates redundancy, and variables that have little or no predictive power.

With respect to the global neural network previously discussed, the dialing records used in generating the network should provide comprehensive dialing trends across multiple industries and locations. Accordingly, the input variables are selected from the available data found in these dialing records. Here, the modeler may have some expert knowledge that allows him to survey the available data and select a reasonable set of candidate input variables to begin with. That is to say, the modeler may be able to select a reasonable set of candidate input variables from the features available in the dialing records based on his experience with respect to what information appears to be related to whether or not placing a call for a particular dialing record is expected to lead to a live connect.

Some features that may be informative of whether or not place a call will lead to a live connect include, for example, an area code and/or a zip code associated with a dialing record, time of day and/or day of week a dialing record is to be dialed, call duration, type of phone number to dial (e.g., home, work, cell, etc.) for a dialing record, ANI area code to be used to dial a dialing record, caller ID to be displayed, number of attempts made to a dialing record over a previous time period (e.g., twenty-four hours, seven days, or thirty days), number of live connects for a dialing record over a previous time period, ratio of live connects to attempts over a previous time period for a dialing record, number of inbound calls from the dialing record over a previous time period, type of call transactions (e.g., collections, sales, survey, etc.) conducted over a previous time period for a dialing record, and/or whether or not a callback was previously scheduled for a dialing record. The same features may also be considered for a local neural network in addition to other features that may be more specific to the dialing history represented in the local dialing records. For instance, the modeler may also consider local features such as agent termination codes for previous connects (e.g., made a sale, accepted a payment, etc.) made for a dialing record, campaign specific information such as account balance, purchase history, days delinquent, etc. for a dialing record, available demographic information for individual(s) associated with a dialing record such as age, sex, etc., and/or the agent who last handled a connect for a dialing record.

Once the modeler has identified a set of candidate input variables, the next step is identifying which of the candidate variables should be used as inputs to the neural network. Accordingly, several search approaches may be used in various embodiments to search through the many possible combinations of the candidate input variables to determine an optimal, or near optimal, set of input variables. One such approach involves simply evaluating all of the possible combinations of input variables and selecting the best set according to predetermined optimality criteria. However, this approach is typically only feasible when the dimensionality of the set of candidate input variables is low.

Another such approach is forward selection that involves selecting individual candidate variables one at a time. Here, a single-variable neural network is trained for each candidate variable and the input variable that maximizes model performance (e.g., model performance-based optimality criterion) is selected. Selection then continues by iteratively training a number of candidate variables minus one bivariate neural networks, in each case adding a remaining candidate to the previously selected input variable. Selection is terminated once the addition of another input variable fails to improve the performance of the model.

Yet another approach is step-wise selection, which is considered an extension of the forward selection approach, except input variables may also be removed at any subsequent iteration. The aim of this approach is to handle redundancy between candidate variables. For example, candidate variable A may be selected initially due to high relevance, but is later found to be inferior to the combination of candidate variables B and C during a subsequent iteration. Accordingly, candidate variable A is now redundant and is removed in favor of the combination of candidate variables B and C.

Finally, another approach is backward elimination, which is essentially the reverse of the forward selection approach. Here, all of the candidate input variables are initially selected, and then the more unimportant variables are eliminated one-by-one. For instance, the relative importance of an input variable may be determined by removing the variable and evaluating the effect on the model retrained without the variable. While in another instance, the lesser relevant candidates are iteratively removed until some optimality criterion is met. Those of ordinary skill in the art can envision other approaches that may be used in selecting which of the candidate input variables to select as inputs to the neural network in light of this disclosure.

Here, a backward elimination approach known as recursive feature elimination (RFE) is implemented in various embodiments to select which of the candidate input variables to use as input to the neural network. The RFE approach involves an iterative process of training a neural network, initially using all candidate input variables, and then removing one or more variables at each iteration based on the rank magnitude of the weights corresponding to each of the variables. Because a neural network can take significant time to train, in some embodiments, a faster substitute classification model such as random forests or boosting may be used with RFE to select the most useful features that will be used in the final production model.

Figure 4:
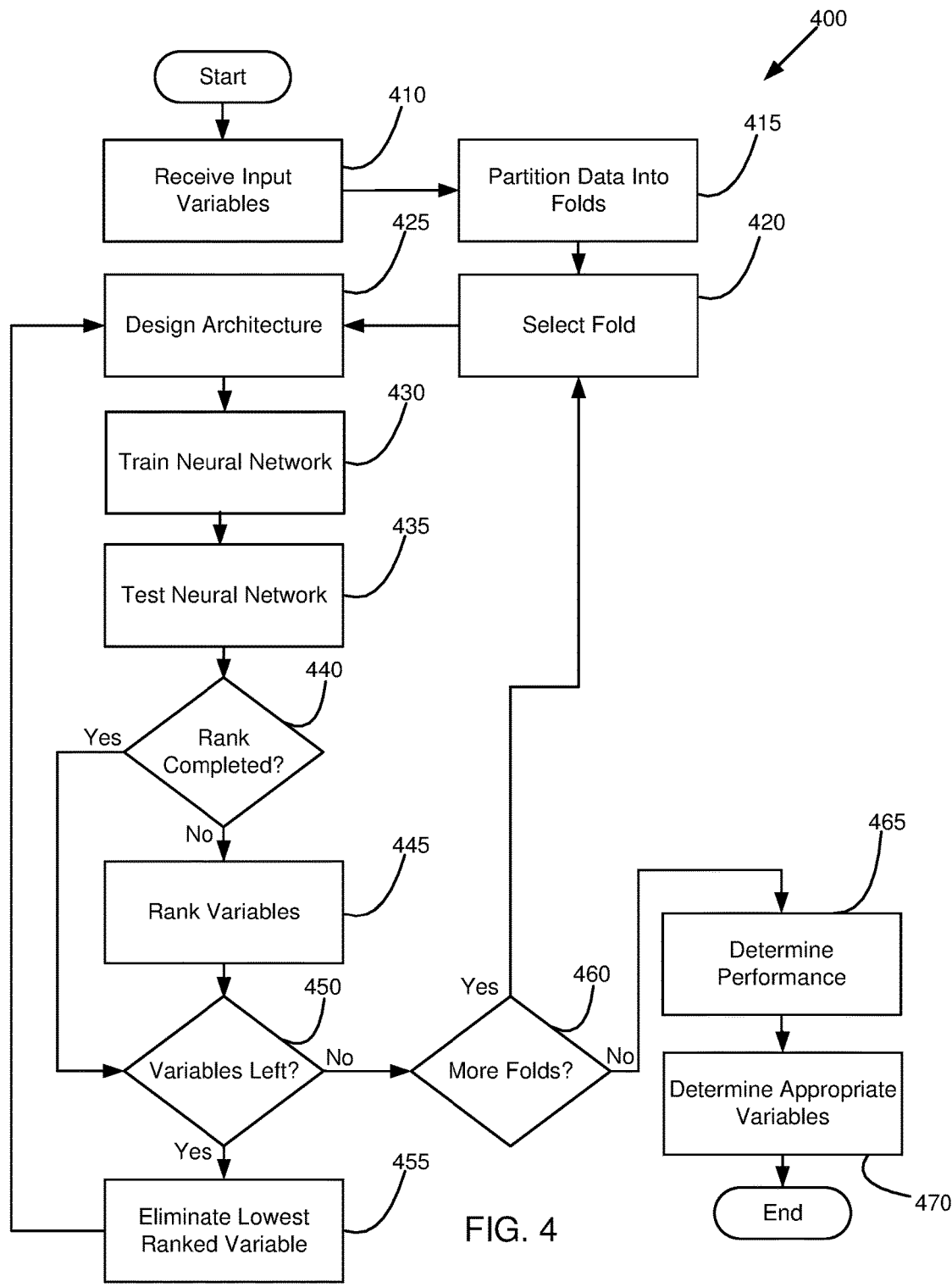
FIG. 4 illustrates an embodiment of a process flow for identifying the input variables for a neural network in accordance with various technologies and concepts disclosed herein.

Accordingly, turning now to FIG. 4, additional details are provided regarding a process flow utilizing RFE in identifying the input variables for a neural network from a set of candidate input variables according to various embodiments of the invention. Specifically, FIG. 4 is a flow diagram showing an identify input variables (IIV) module for performing such functionality according to various embodiments of the invention. For example, the process flow shown in FIG. 4 may correspond to operations carried out by a processor in a component, such as the CTI server 245 described above with respect to the call center architecture 200 shown in FIG. 2, as it executes the IIV module stored in the component's volatile and/or nonvolatile memory.

The process 400 begins with the IIV module receiving the set of candidate input variables in Operation 410. Depending on the embodiment, the IIV module may receive the set of candidate input variables in a variety of ways. For instance, the modeler may load the set into a file or some other data source such as a database that is read by the IIV module. While in other instances, the modeler may type the set of candidate input variables into an interface that is read by the IIV module. Those of ordinary skill in the art can envision other mechanisms that may be utilized so that the IIV module receives the set of candidate input variables in light of this disclosure.

At this point, the IIV module partitions the sample of dialing records into folds in Operation 415. Again, the IIV module may read or receive the sample of dialing records in a variety of ways depending on the embodiment. In addition, the modeler may indicate the number of folds, which identifies the number of iterations the IIV module is to perform during the process 400. Accordingly, the IIV module randomly partitions the sample of dialing records into K equal size subsamples (folds) in which the single subsample is retained as the validation data for testing and the remaining K−1 subsamples are used as training data. For example, the modeler may have indicated to perform a 10-fold validation, and the IIV module responds in Operation 415 by randomly partitioning the sample of dialing records into ten equal size subsamples of dialing records. In particular embodiments, the IIV module may also be configured to partition the sample of dialing records so that each fold contains roughly the same proportion of records that result in live connects over the represented time period and records that did not. Next, the IIV module selects a first one of the folds (a particular subsample of the dialing records) in Operation 420. As noted above, this initial subsample of dialing records is to be used as testing data and the remaining subsamples of dialing records are to be used as training data to train the neural network.

Although not shown in FIG. 4, in particular embodiments, the IIV module may be configured to preprocess the data in the dialing records. Normalization is a widely used preprocessing method that involves transforming each data input to distribute the data evenly and scale it into an acceptable range for the network. Here, the IIV module may be configured to normalize the data found in the dialing records for the set of candidate input variables. For instance, in one embodiment, the IIV module may normalize the data by performing a simple linear scaling of the data into a range used by neurons of the network. This is typically the range of negative one to one or zero to one. While in another embodiment, the IIV module may normalize the data by utilizing a statistical measure of central tendency and variance to help remove outliers, and spread out the distribution of the data, which tends to increase uniformity. Here, the mean and standard deviation are used to establish a maximum value and a minimum value and any data that falls above the maximum value is set to the maximum value and any data that falls below the minimum value is set to the minimum value. Yet in another embodiment, the IIV module may normalize the data by minimizing the standard deviation of the heights of the columns in the initial frequency distribution histogram of a variable. Whatever method of preprocessing is utilized, it is important to note that typically any preprocessing statistics used during normalization, such as mean and standard deviation, are only computed on the training data, and then applied to the validation data. Those of ordinary skill in the art may utilize other methods of normalization as is known in the art in light of this disclosure.

Moving on, the IIV module designs the initial architecture of the neural network based on the number of variables in the set of candidate input variables in Operation 425. As noted above, the basic structure of a neural network includes one input layer, one or more hidden layers, and one output layer. Here, the IIV module designs the initial architecture of the neural network so that the input layer has a number of nodes (neurons) equal to the number of input variables found in the set of candidate input variables, one node for each variable. In addition, the IIV module may be configured to design the architecture to have one or more hidden layers depending on the embodiment. For instance, in particular embodiments, the IIV module may be configured to design the architecture to have a single hidden layer and to include a number of nodes for the hidden layer based on one or more design rules.

These design rules can differ in various embodiments. For example, in one embodiment, the IIV module may include a single hidden layer in the architecture and may use a design rule that indicates the number of nodes for the hidden layer should be set to the medium of the number of nodes in the input layer and the number of nodes in the output layer, rounded to the nearest whole number. Here, the output layer has a number of nodes equal to the number of possible classifications, which is two—live connect or not. Therefore, if the set of candidate input variables includes twenty-five variables, the IIV module sets the number of nodes for the hidden layer to fourteen (i.e., 25+2/2=13.5, rounded to the nearest whole number 14.) Therefore, in the example, the IIV module designs the initial architecture of the neural network to include an input layer of twenty-five nodes, one for each candidate input variable, a hidden layer with fourteen nodes, and an output layer with two nodes, one for each classification. Further, the IIV module may be configured to assign activation functions to the nodes of the different layers such as, for example, a sigmoid or tanh activation function to the nodes of the input and hidden layers and a softmax activation function to the two nodes of the output layer. Finally, the IIV module may be configured to initialize the weights of the nodes. Several different methods for determining the initial weights may be used by the IIV module depending on the embodiment. For instance, the IIV module may be configured to initialize the weights of the nodes to small numbers by randomly sampling from a multi-dimensional Gaussian. However, a problem with using such a method to initialize the weights of the nodes is the distribution of the outputs from a randomly initialized node has a variance that grows with the number of inputs. Therefore, to combat this problem, the IIV module may also divide each weight by the square root of the number of inputs.

Once the IIV module has designed the architecture of the neural network, the IIV module trains the neural network using the dialing records in the folds that were not initially selected (the training dataset) in Operation 430. Here, "learning" occurs in the perceptron by changing/updating connection weights after data is processed, based on the amount of error in the output compared to the expected results. In particular embodiments, the IIV module may make use of batch gradient descent or mini-batch gradient descent to update the weights of the nodes.

Gradient descent involves defining a cost function to aid in measuring how far away a particular solution is from an optimal solution to the problem to be solved. The cost function is largely dependent on the learning task, i.e., supervised, unsupervised, and reinforcement. In this instance, the learning task falls under supervised in various embodiments since the modeler is making use of a training dataset in which the outcome is known for each of the dialing records. Thus, under supervised learning, the aim is to find a function that matches the dialing records found in the training dataset. In other words, the aim is to find a function that has the smallest possible cost.

Accordingly, in particular embodiments, the modeler may make use of mean-squared error as the cost function. In these particular embodiments, the task involves trying to minimize the average squared error between the neural network's output and the target result over the records found in the training dataset. Accordingly, gradient descent is used to try and minimize this cost function (e.g., find a local minimum) by taking steps proportional to the negative of the gradient of the cost function at a current point.

In addition, backpropagation may be used in conjunction with gradient descent in various embodiments. Backpropagation involves calculating the gradient of the loss function with respect to all of the weights in the neural network and feeding the gradient to the optimization method, which in turn uses the gradient to update the weights in an attempt to minimize the loss function. Here, for each propagation, the input variables for each record in the training dataset are fed through the neural network to generate the propagation's output activations. The output activations are then backwards propagated through the neural network using the known outcomes for the dialing records to generate the deltas (the difference between the targeted and actual output values) of all output and hidden neurons. The weights are then updated by first multiplying a weight's output delta and input activation to get the gradient of the weight and then subtracting a ratio (learning rate) from the gradient of the weight. The learning rate determines how big of an update is performed. Generally speaking, the greater the learning rate, the faster a node trains, while the lower the learning rate, the more accurate the training is.

The choice of whether to use batch gradient descent or mini-batch gradient descent may be largely dependent on the allocated training time, memory, and computing capacity. Batch gradient descent involves computing the gradient of the cost function to the weights for the entire training dataset. Therefore, as the gradients are calculated for the whole dataset to perform just one update, batch gradient descent can be very slow and difficult for datasets that are too large for the available memory. However, with that said, batch gradient descent is guaranteed to converge to the global minimum for convex error surfaces and to a local minimum for non-convex surfaces. Thus, batch gradient descent provides accurate weight updates, although typically at a cost of time it takes to perform an update.

On the other hand, mini-batch gradient descent performs an update for mini-batches of the training dataset. For instance, common mini-batch sizes may range from fifty to two-hundred and fifty-six records. By reducing the size of the dataset for performing an update, mini-batch gradient descent can relieve the difficulties experienced under normal batch gradient descent with respect to speed of training the network and resources needed in performing an update. However, the tradeoff of using mini-batch gradient descent as opposed to batch gradient descent is the accuracy of updates may not be as precise.

In particular embodiments, the modeler may also wish to adapt updates to each individual weight to perform larger or smaller updates depending on their importance. For instance, the modeler may implement adaptive moment estimation to compute adaptive learning rates in which the learning rates are adapted to perform larger updates for infrequent variables and smaller updates for frequent variables. Those skilled in the art will know that other techniques including but not limited to adagrad, adadelta, and RMSProp may be used to compute the best learning rate for each weight.

In addition, the modeler may make use of regularization, such as dropout or L2 regularization, to prevent the neural network from overfitting the training data. In general, by building a very complex neural network, it can become quite easy to perfectly fit a dataset. That is, it can become quite easy to fit noise in the dataset instead of the underlying relationships. As a result, the neural network typically performs poorly on new data because the network does not generalize well. Accordingly, some form of regularization may be used to avoid this problem.

Dropout regularization involves only keeping a node active with some probability of p, or setting it to zero otherwise. Intuitively, such action forces the neural network to be accurate even in the absence of certain information and prevents the network from becoming too dependent on any one node or small combination of nodes. On the other hand, L2 regularization involves augmenting the error function with the squared magnitude of all weights in the neural network. Thus, L2 regularization has the intuitive interpretation of heavily penalizing peaky weight vectors and preferring diffuse weight vectors. As a result, L2 regularization has the appealing property of encouraging the neural network to use all of its inputs a little rather than some of its inputs a lot. Other forms of regularization may be utilized in various embodiments as those of ordinary skill in the art can envision in light of this disclosure such as, for example, L1 regularization and max norm constraints.

In other embodiments, the modeler may wish to use methods such as batch normalization or residual learning to further improve the performance of the model. In batch normalization, the output from each layer of the neural network is normalized before being sent to the following layer of the neural network. In other words, once the input data goes through a layer of the neural network, the output of that layer is divided by the standard deviation of that output and subtracted by the mean of that output before being sent to the following layer of the neural network. Batch normalization has been shown to improve the learning speed and accuracy of neural networks. This is because many activation functions work best on data that is normalized and centered at 0 or 0.5.

In residual learning, instead of immediately feeding the output of a neural network layer into the following layer, the output of each layer is first saved. The final output of the neural network is then calculated as the sum of the output of each of the hidden layers. In other words, instead of a neural network layer transforming the output of the previous layer, each neural network layer output is added to the output of the previous layer. This forces each layer of the neural network to be useful and add additional accuracy to the overall model, and allows for neural networks with more hidden layers without sacrificing overall performance.

In some embodiments, the modeler may wish to utilize distributed computing systems (e.g., a computer cluster) to reduce the time required to train the model. In a distributed system, the total computing work required to train a model is split between multiple machines. Each machine processes a portion of the total work, and the final result is then combined together to form the final model. By increasing the number of machines simultaneously working on the problem, the total time to complete training can be significantly reduced.

Finally, the modeler may also employ graphics processing units (GPUs) to aid in handling computations. Essentially, a pipeline is set up between one or more GPUs and central processing units (CPUs) that allows for analyzing of data as if it were in an image or other graphic form. For example, a proprietary framework such as Nvidia CUDA allows using C programming language to code algorithms for execution on Geforce 8 series GPUs. Migrating data into graphical form and then using a GPU to analyze the data can result in significant speed increases in performing computations.

Once the IIV module has trained the neural network using the training dataset, the resulting neural network should be usable to generate accurate predictions (generalize) on new dialing records. Thus, the IIV module next tests the resulting neural network in Operation 435 to evaluate the neural network's ability to generalize. In this instance, the IIV module uses the dialing records in the selected fold to conduct the test of the neural network. Accordingly, the testing determines the expected accuracy in predicting whether a call will result in a live connect for various dialing records.

It is noted that in particular embodiments, the modeler may establish a threshold for an expected accuracy the neural network is to meet in order to be considered an acceptable model for predicting whether a call will result in a live connect for dialing records. Therefore, although not shown in FIG. 4, the IIV module in these particular embodiments may ensure the expected accuracy of the neural network meets the threshold before further processing is carried out by the module. Accordingly, if the expected accuracy of the neural network does not meet the threshold, then the IIV module may inform the modeler of such and exit from further processing. As a result, the modeler may want to consider his selection of the set of candidate input variables and revise the set accordingly to attempt to improve the accuracy of the neural network. Once the modeler has modified the set of candidate input variables, the modeler restarts the process for identifying the input variables by invoking the IIV module.

At this point, the IIV module determines whether a ranking of the importance of the input variables has been performed in Operation 440. Since this is the first iteration carried out by the IIV module, the module determines that a ranking of the importance of the input variables has not been performed. Therefore, the IIV module ranks the input variables based on their importance in predicting whether a call is expected to result in a live connect for a dialing record in Operation 445. In various embodiments, this operation entails the IIV module ranking the input variables in order of importance based on their weights. In particular embodiments, the IIV module may provide a ranking of importance of the input variables for each class (i.e.: 1. a live connect and 2. not a live connect) and/or a single ranking of importance by averaging the importance across the classes.

The IIV module next determines whether any of the candidate input variables are still left to remove as input to the neural network in Operation 450. Again, since this is the first iteration carried out by the IIV module, the module determines there are candidate input variables still available to remove as input. Accordingly, the IIV Module eliminates one or more of the lower ranked input variables in Operation 455. For instance, depending on the embodiment, the IIV module may be configured to carry out this operation by eliminating a certain number (e.g., percentage) of the candidate input variables or eliminating candidate input variables with an importance that falls below a threshold value.

Once the IIV module has eliminated one or more of the lower ranked variables, the IIV module returns to Operation 425 and redesigns the network architecture based on the set of candidate input variables minus the one or more variables that have been eliminated. At this point, the IIV module carries out the same operations as described above for the redesigned neural network. It is noted that although not shown in FIG. 4, the IIV module may be configured in particular embodiments to re-rank the set of remaining candidate input variables for each training of the neural network using the different number of input variables.

At some point, the IIV module determines there are no candidate variables left to eliminate in Operation 450. In this instance, the IIV module determines whether any folds remain from partitioning the data in Operation 460. If so, the IIV module returns to Operation 420 and selects the next fold as the testing dataset and the remaining dialing records as the training dataset. At this point, the IIV module repeats the operations described above for the newly selected fold. This process continues until the IIV module has conducted the operations (iterations) for all of the folds.

Figure 5:
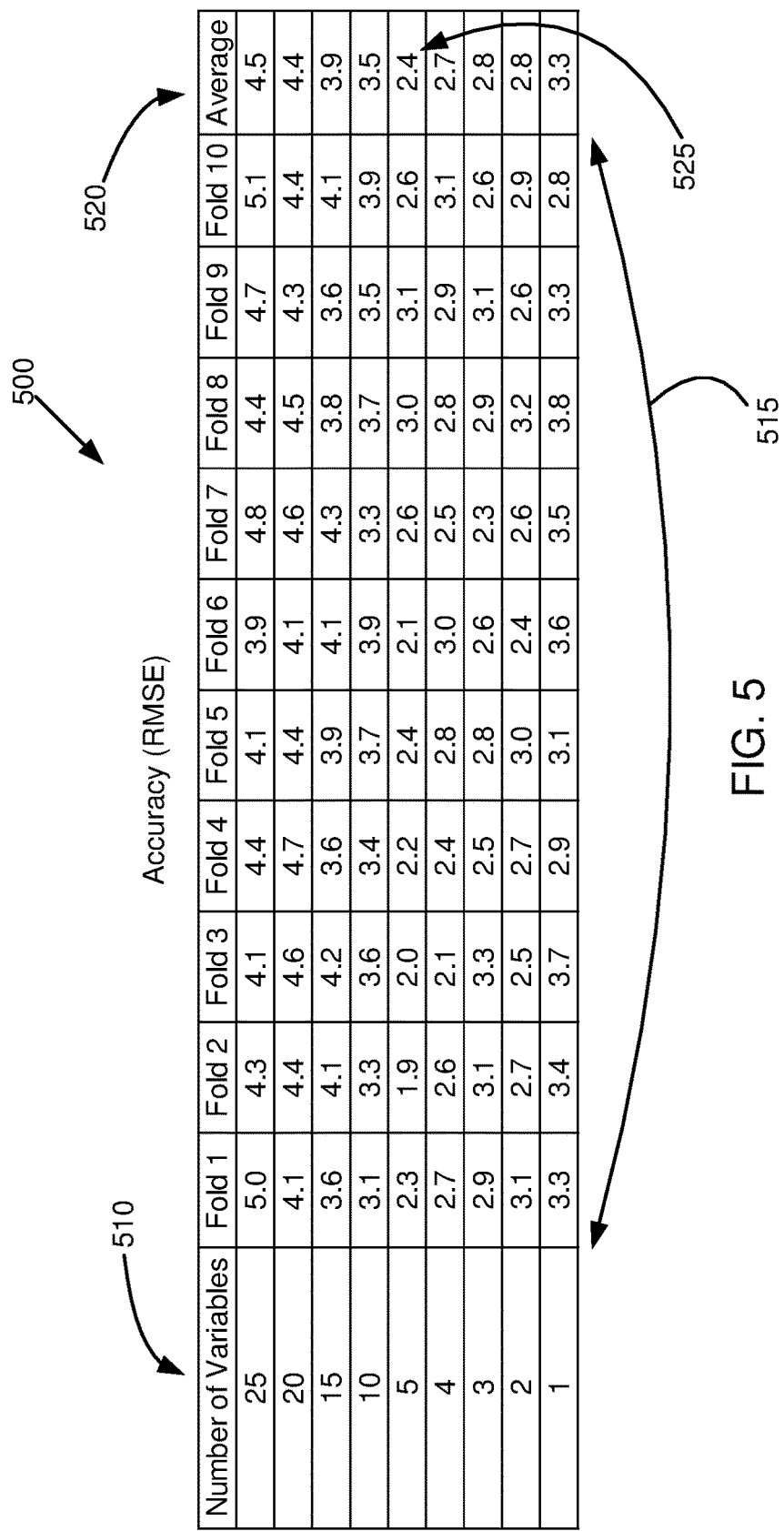
FIG. 5 illustrates a table providing the degree of error from conducting iterations to identify the input variables for a neural network.

Finally, the IIV module determines in Operation 460 that no further folds remain and moves on to Operation 465 to determine the performance of the neural networks using the error results of each iteration conducted for the ten folds. Turning briefly to FIG. 5, the table 500 shown in this figure provides the root-mean-square error (RMSE) for conducting the 10-fold iterations for the recursive feature selection. In this instance, the IIV module is configured to remove the five least important input variables for each model fit conducted for an iteration until five variables are left, and then the IIV module is configured to remove the remaining input variables one at a time. Here, the first column 510 of the table 500 lists the number of input variables used during a particular model fit. The remaining columns 515 provide the RMSE for each iteration using the corresponding number of input variables to fit the model to the training dataset and the last column 520 provides the average of the RMSE for each number of input variables. As the results show, the number of input variables that performed the best was five variables at a RMSE of 2.4 525. Therefore, returning to FIG. 4, the IIV module determines the appropriate variables are the five highest ranked candidate input variables in Operation 470. Again, the ranking used in selecting the five input variables in particular embodiments may be based on the average ranking of the candidate input variables over the 10-fold iterations.

Neural Network Generation Module

Now that the input parameters have been identified for the neural network, the next important component in implementing a neural network to predict whether a call is expected to result in a live connect for a dialing record is determining the optimal or near optimal architecture of the network. That is to say, determining the optimal or near optimal number of hidden layers and size of the hidden layers.

As previously mentioned, as the number and size of hidden layers increases in a neural network, the capacity of the network increases. However, increasing the capacity of the neural network can be both beneficial and detrimental to the performance of the network. The reason for this is because the complexity of the neural network architecture can lead to overfitting the training data. However, this problem is normally addressed using practices such as regularization, dropout, and input noise. Therefore, establishing the number of hidden layers and size of these layers is not typically driven by a concern for overfitting the training data. Instead, in various embodiments, the deciding factor in determining the number of hidden layers to include in the neural network(s) and the size of these hidden layers is time and computational capabilities available in developing and testing the neural network(s).

Figure 6:
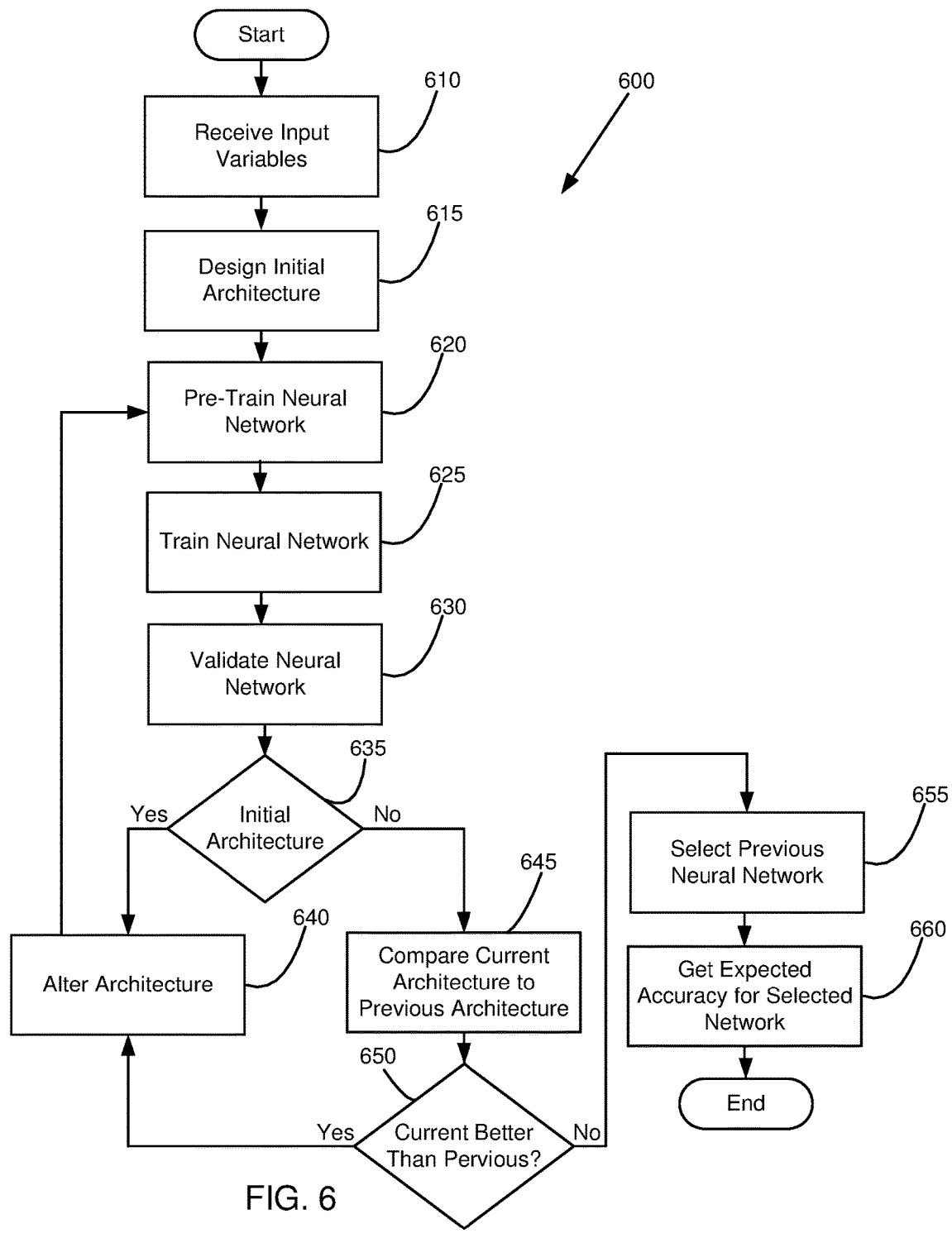
FIG. 6 illustrates an embodiment of a process flow for generating neural networks in accordance with various technologies and concepts disclosed herein.

Turning now to FIG. 6, additional details are provided regarding a process flow that may be used in generating a neural network for predicting whether a call is expected to result in a live connect for individual dialing records according to various embodiments of the invention. Specifically, FIG. 6 is a process flow carried out by a neural network generations (NNG) module for performing such functionality according to various embodiments of the invention. For example, the process flow shown in FIG. 6 may also correspond to operations carried out by a processor in a component, such as the CTI server 145 described above with respect to the call center architecture 200, as it executes the NNG module stored in the component's volatile and/or nonvolatile memory.

In various embodiments, several steps are initially taken prior to invoking the NNG module. Firstly, in particular embodiments, the input parameters are identified to use for the neural network. For instance, the process 400 described above and shown in FIG. 4 may be performed to identify the most relevant parameters from a pool of candidate parameters with respect to predicting whether a call will result in a live connect for a dialing record. Secondly, in particular embodiments, data is gather on dialing records that were previously dialed and the outcome of those previous dials. Similar to the dialing records used in the process 400 to determine the input parameters to use for the neural network, the data used for generating the neural network architecture includes dialing records representative of the type of neural network being generated. For instance, if the neural network being generated is the global network discussed above, then the data includes dialing records that provide comprehensive dialing trends across multiple industries and locations. While if the neural network being generated is a local network discussed above, then the data includes dialing records that provide more localized dialing trends.

Next, the dialing records are randomly split into three different sets of data: training; cross validating; and testing. Depending on the embodiment, this process may be carried out manually or by the NNG module (although such an operation is not shown in FIG. 6). Here, the training data is used to train a particular neural network architecture. In turn, the cross validating data is used to tune the parameters of the neural network once it has been trained, and the testing data is used to evaluate the performance of the neural network. Accordingly, the dialing records may be divided into the three groups of data according to a number of different configurations in various embodiments. For instance, the dialing records may be divided up so that the training data includes eighty percent of the dialing records, while the cross validating and testing data include ten percent each.

Looking at FIG. 6, the process 600 begins with the NNG module receiving the input variables for the neural network in Operation 610. Here, the input variables may be provided to the NNG module in different ways depending on the embodiment. For instance, in particular embodiments, the NNG module may read the variable from a data source such as a file or database. While in other embodiments, the modeler may enter the input variables in a screen that is read by the NNG module. Those of ordinary skill in the art can envision other ways the NNG module can receive the input variables in light of this disclosure.

Next, the NNG module designs the initial architecture for the neural network in Operation 615. In particular embodiments, the NNG module may be configured to initially use the architecture of the resulting neural network from the process conducted to identify the input variables (shown in FIG. 4). While in other embodiments, the NNG module may be configured to use some variation of the architecture of the resulting neural network from the process conducted to identify the input variables.

For instance, returning to the example in which five variables were identified as the optimal set of variables to input into the neural network, the NNG module may be configured to initially use the architecture of the neural network resulting from the process identifying the input variables for the network. Therefore, the NNG module may determine the initial architecture includes an input layer of five nodes, one for each input variable, a first hidden layer of four nodes, and an output layer of two nodes, one for each classification, i.e., live connect or not. In addition, the NNG module may use the resulting weights from the process identifying the input variables for the network.

Next, the NNG module pre-trains the neural network in Operation 620. Although not necessarily carried out by each embodiment of the NNG module, the importance of conducting a pre-training phase, especially for deep neural networks involving two or more hidden layers, has been shown to noticeably improve the final performance of these networks after supervised training. See "Why Does Unsupervised Pre-training Help Deep Learning?" Erhan et al., Journal of Machine Learning Research 11, pages 625-660, published February 2010.

Here, the NNG module is configured in particular embodiments to use a Restricted Boltzman Machine (RBM) to pre-train the neural network. The RBM is a shallow, two-layer neural network that includes a first layer called the visible, or input, layer, and a second layer that is hidden. The NNG module reconstructs data by themselves in an unsupervised fashion (without using the outcomes for the dialing records in the training dataset), making several forward and backward passes between the visible layer and the hidden layer. First, a forward pass is conducted using the data to produce activations from the hidden layer. Then, the activations of the hidden layer become the input in a backward pass. They are multiplied by the same weights as the inputs on the forward pass and the sum of the products is added to a visible-layer bias at each visible node so that the output is a reconstruction, i.e., an approximation of the input.

Initially, the reconstruction error (the difference between the reconstruction and the input) is quite large, and this error is then backpropagated against the RBM's weights, again and again, in an interactive learning process by the NNG module until an error minimum is reached. Thus, by interactively adjusting the weights according to the error, the NNG module, via the RBM, learns to approximate the original data. That is to say, by performing reconstruction, the NNG module makes a guess about the probability distribution of the original input.

At this point, the NNG module trains the neural network using the training data in Operation 625 in a same or similar fashion as described above with respect to FIG. 4. Again, the NNG module may be configured to aid the training of the neural network by normalizing the input data, adapting updates to each individual weight to perform larger or smaller updates depending on their importance, using regularization, and/or using GUIs.

Upon training the neural network, the NNG module validates the neural network in Operation 630 using the cross validation dataset. Through validation, the NNG module determines how well the neural network is able to predict whether a call will result in a live connect on the new dialing records found in the cross validation dataset (previously unseen records). Accordingly, in various embodiments, the NNG module determines the generalization error of the neural network.

After validating the neural network, the NNG module determines whether the current architecture is the initial architecture for the neural network in Operation 635. In this instance, it is. Therefore, the NNG module alters the architecture in Operation 640. Depending on the embodiment, the NNG module may go about this operation in different ways.

In general, the performance of the neural network is dependent on several parameters of the network besides simply what input variables are used. For instance, the number of hidden layers included in the neural network and the number of nodes to include for these layers can have a profound effect on performance. Too few hidden layers and/or nodes can result in a neural network that cannot learn the relationships in data properly. While too many layers and/or nodes can result in a neural network with high complexity and execution time. In addition, the activation functions can have an effect on the performance of the network. There is no consensus on what type of activation function should be used and many times, the type is dependent on the type of input data and the case to be modeled. Finally, the learning rate can have an effect on the performance of the neural network. Specifically, the training of the network can be significantly improved if the optimal learning rate is used.

Therefore, in various embodiments, the NNG module modifies the architecture in a systematic approach to develop a network that will performance as close to optimal in predicting whether a call placed to a dialing record is expected to result in a live connect. Firstly, in particular embodiments, the NNG module may evaluate the generalization error to determine whether the activation functions and/or learning rates needs to be adjusted. For instance, in particular embodiments, a threshold value is set for the generalization error. In these particular embodiments, the NNG module may evaluate whether the generalization error is over the threshold value and if so, the NNG module may adjust the activation functions and/or learning rates and rerun the training and validating operations in hopes of lowering the generalization error of the neural network. Whether the NNG module adjusts the activation functions and/or the learning rates may be dependent on the amount the generalization error is over the threshold in some embodiments. For example, in one embodiment, if the generalization error is over ten percent of the threshold value, then the NNG module adjusts the activation functions for nodes in the hidden layer(s). However, if the generalization error is under ten percent of the threshold value, then the NNG module adjusts the learning rates for the nodes in the hidden layer(s). Those of ordinary skill in the art can envision other adjustments the NNG module can make to the activation functions and/or learning rates in light of this disclosure.

Continuing on, once the NNG module has evaluated the generalization error in particular embodiments, the NNG module may alter the architecture of the neural network by adding a node to a hidden layer. Returning to the example, the hidden layer currently has four nodes, so the NNG module adds a node to the hidden layer to make a total of five nodes. In addition, the NNG module establishes a starting weight for the node.

At this point, the NNG module returns to Operation 620 and pre-trains the neural network with the altered architecture as described above. In turn, the NNG module also trains and validates the network in Operations 625 and 630. However, this time the NNG module determines the architecture of the current neural network is not the initial architecture in Operation 635 and as a result, the NNG module compares the current architecture of the neural network with the previous architecture of the network in Operation 645. Accordingly, in particular embodiments, the NNG module determines in Operation 650 whether the generalization error for the current architecture of the neural network is lower than the generalization error of the previous architecture of the network. If so, then the NNG module returns to Operation 640 and further alters the architecture of the neural network in an attempt to improve the model.

Here, in particular embodiments, the NNG module may be configured to adhere to a set of alteration rules to determine how to further alter the architecture of the network. For example, a rule may indicate that the NNG module is to add nodes to the current hidden layer until the number of nodes for the hidden layer equals the number of nodes for the previous layer (in this case, the input layer). Once the number of nodes equals the number of nodes in the previous layer, the NNG module is to then alter the architecture by adding another hidden layer. In addition, the rules may indicate that the maximum number of hidden layers is two. Therefore, returning to the example, the NNG module determines the first hidden layer has five nodes and this number of nodes matches the number of nodes found in the input layer. Accordingly, the NNG module adds a hidden layer to the architecture of the neural network with four nodes.

Again, the MMG module returns to Operation 620 and pre-trains the neural network with the new architecture having two hidden layers, the first hidden layer having five nodes and the second hidden layer having four nodes, and then continues on with training and validating the network. As some point, the NNG module determines at Operation 650 the new architecture does not outperform the previous architecture of the neural network. Depending on the embodiment, the NNG module may not simply just look at the new architecture and the previous architecture but may instead look at a number of architectures in Operation 650. For example, the NNG module may be configured in a particular embodiment to determine whether the last ten architectures did not outperform a previous architecture in Operation 650. Regardless of the number of architectures considered, if the NNG module determines at Operation 650 the new architecture(s) do not outperform a previous architecture, then the NNG module selects the previous architecture of the neural network as the final architecture to use for the network in Operation 655. Finally, the NNG module determines the expected accuracy of the selected neural network by testing the network using the testing dataset in Operation 660. At this point, the modeler may then view the results of the testing to determine whether the final neural network is performing at an acceptable level in predicting whether a call placed to a dialing record is expected to result in a live connect. If not, then the modeler may want to consider further altering the architecture of the neural network in some way (e.g., altering the number of hidden layers, nodes per hidden layer, activation functions, and/or learning ratings) to attempt to improve the network's performance. Accordingly, once the modeler has altered the architecture of the network, the modeler may invoke the NNG module to re-process the alter architecture in the same fashion as described above.

Ensemble Generations Module

As already mentioned, global and local neural networks are combined to generate an ensemble in various embodiments to improve the overall accuracy in predicting whether a call placed to a dialing record is expected to result in a live connect. Here, the global neural network is based on dialing records representing comprehensive dialing trends across multiple industries, purposes, locations and/or dialing devices. While the local neural network is based on dialing records for a specific dialing history. For example, the dialing history for a specific contact center or dialer in a contact center.

Depending on the embodiment, the global and local neural networks may be combined using several different techniques to generate the ensemble. The first of these techniques is bagging. Bagging involves combining classifiers via majority voting so that the class that receives the most votes is selected as the class for the particular instance. Here, bagging would involve combining the global neural network and the local neural network by giving each network a vote in determining whether a particular dialing record is expected to result in a live connect or not.

However, a problem with using bagging in this instance is when each neural network provides a different prediction. For example, the question becomes what should be the selected prediction for a particular dialing record in an instance when the global neural network predicts the dialing record is expected to result in a live connect and the local neural network predicts the dialing record is not expected to result in a live connect? Such an instance may be handled differently depending on the embodiment. For example, in one embodiment, the prediction for the local neural network may be used because this network is considered to be more representative of the dialing records being called since the network is based on the local dialing history. While in another embodiment, each of the neural networks may be weighted based on their accuracy. Here, the accuracy for each neural network can be based on, for example, a testing dataset (e.g., a testing dataset based on local dialing records) or on historical values developed based on actual predictions carried out by the neural network on dialing records.

A second technique is boosting. This technique involves training the combination of models using a weighted training dataset in which each dialing record in the training dataset has a weight. Here, when a dialing record is misclassified by one of the neural networks, the dialing record's weight is increased so that the next network is more likely to classify it correctly. The output is the weighted majority of the global and local neural networks. Boosting, in general, decreases the bias error and builds strong predictive models. However, boosting can sometimes overfit the training dataset.

Finally, a third technique is stacking. The basic idea behind stacking is using a pool of base classifiers (e.g., the global and local neural networks) and then using another classifier to combine their predictions, with the aim of reducing the generalization error. Stacking can lead to a decrease in either the bias or variance error depending on the combining learner used. For instance, in particular embodiments, the global and local neural networks may be combined into another neural network built (trained, validated, and tested) using local dialing records. While in other embodiments, the global and local neural networks may be combined using some other type of modeling such as logistic regression.

Figure 7:
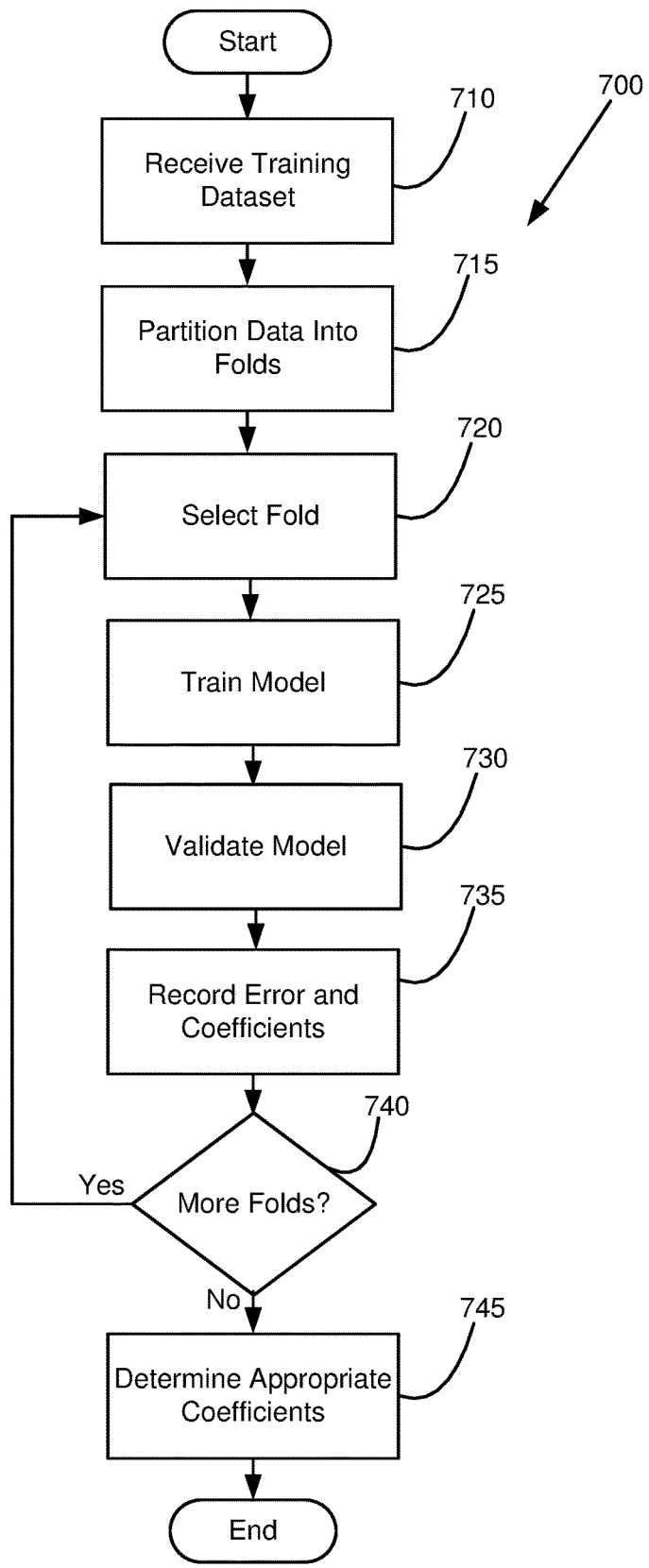
FIG. 7 illustrates an embodiment of a process flow for generating an ensemble for the global and local neural networks in accordance with various technologies and concepts disclosed herein.

Turning now to FIG. 7, additional details are provided regarding a process flow that may be used in generating an ensemble from the global and local neural networks according to various embodiments of the invention. Specifically, FIG. 7 is a process flow carried out by an ensemble generations (EG) module for performing such functionality according to various embodiments of the invention. For example, the process flow shown in FIG. 7 may also correspond to operations carried out by a processor in a component, such as the CTI server 145 described above with respect to the call center architecture 200, as it executes the EG module stored in the component's volatile and/or non-volatile memory.

In this instance, the ensemble generated is a logistic regression model, although those of ordinary skill in the art understand that other types of models may be utilized to generate the ensemble as briefly described above. Here, logistic regression is used to model the probability of a default class (e.g., a live connect). More specifically, the odds of a specific dialing record resulting in a live connect can be modeled as:

$$\text{odds}=e^{\hat{}}(b0+b1*\text{global network prediction}+b2*\text{local network prediction})$$

The question becomes what values to assign the coefficients b0, b1, and b2. Therefore, in various embodiments, the coefficients are estimated from a training dataset derived from the predictions from the global and local neural networks (whether a call to a dialing record is expected to result in a live connect or not) and the actual outcomes (whether a call to the dialing record did, in fact, result in a live connect or not) for a set of local dialing records and the best coefficients result in a model that predicts a value very close to one for the default class (e.g., a live connect) and a value very close to zero for the other class (e.g., not a live connect).

Accordingly, the process 700 shown in FIG. 7 begins with the EG module receiving a set of local dialing records in Operation 710. Depending on the embodiment, the EG module may be configured to access the dialing records from some storage source such as a file or database. In addition, the dialing records may already include prediction results for each record with respect to the global and local neural networks. However, although not shown in FIG. 7, in some instances the EG module may be configured to first run the input variables for each of the dialing records through both the global and local neural networks to generate prediction results for the networks.

At this point, the EG module partitions the set of dialing records into folds in Operation 715. Here, the modeler may indicate the number of folds that identifies the number of iterations the EG module is to perform during the process 700 and accordingly, the EG module randomly partitions the set of dialing records into K equal size subsamples (folds) in which the single subsample is retained as the validation dataset for testing and the remaining K−1 subsamples are used as the training dataset. Next, the EG module selects a first one of the folds (a particular subsample of the dialing records) in Operation 720. As noted above, this initial subsample of dialing records is to be used as the validation dataset and the remaining subsamples of dialing records are to be used as the training dataset to train the logistic regression model.

Next, the EG module trains the logistic regression model in Operation 725 using the training dataset (e.g., the remaining K−1 subsamples from the fold). The goal here is to estimate the coefficients in the model using a maximum likelihood estimation that entails finding a set of coefficients for which the probability of the observed data in the training dataset is greatest. That is to say, a maximum likelihood estimation seeks values for the coefficients that minimize the error in the probabilities predicted by the model to those in the data. Thus, a minimization algorithm is used to optimize the best values for the coefficients for the training dataset such as, for example, an efficient numerical optimization algorithm based on a quasi-Newton method such as DFP or BFGS.

Upon training the logistic regression model to estimate the coefficients in the model, the EG module validates the regression model in Operation 730 using the validation dataset (the subsample for the fold) to determine how well the logistic regression model is able to predict whether a call is expected to result in a live connect on the new dialing records found in the validation dataset (previously unseen records). Accordingly, in various embodiments, the EG module determines the generalization error of the logistic regression model and records the error along with the corresponding coefficients in Operation 735.

At this point, the EG module determines whether any folds remain for running another iteration in Operation 740. If so, then the EG module returns to Operation 720 and selects the next fold and repeats the training, validating, and recording operations 725, 730, 735 for the newly selected fold.

At some point, the EG module completes running iterations for all of the folds. At this point, the EG module determines the appropriate coefficients to use for the logistic regression model in Operation 745. Depending on the embodiment, the EG module may carry out this operation in a number of different ways. For instance, in particular embodiments, the EG module may be configured to select the coefficients that resulted in the lowest generalization error. However, in other embodiments, the EG module may be configured to average the coefficients that resulted in a generalization error below a certain threshold or average the coefficients that resulted in some number (e.g., five) of lowest generalization errors. Those of ordinary skill in the art can envision other criteria that may be used by the EG module in determining the appropriate coefficients for the logistic regression model in light of this disclosure.

As a result of this process 700, an ensemble is generated from the global and local neural network that can be used in a production environment to predict whether a call to a particular dialing record is expected to result in a live connect and in turn, help to predict call pacing hit ratios. Accordingly, a predictive dialer can now make use of this ensemble in real-time to aid in predicting call pacing hit ratios and in turn, the number of dialing records to dial at any given time.

Pacing Module(s)

Figure 8:
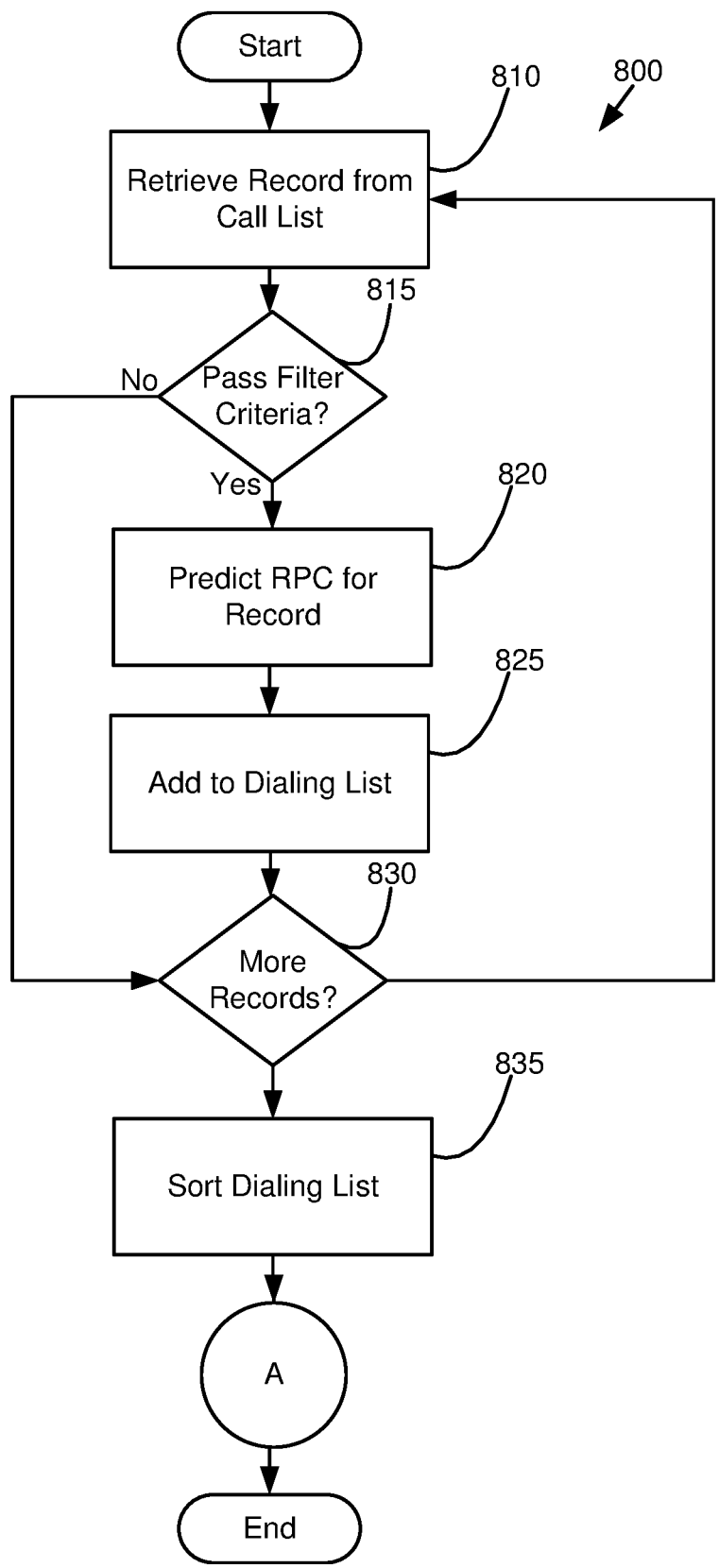
FIG. 8 illustrates an embodiment of a process flow for sorting a list of dialing records in accordance with various technologies and concepts disclosed herein.
Figure 9:
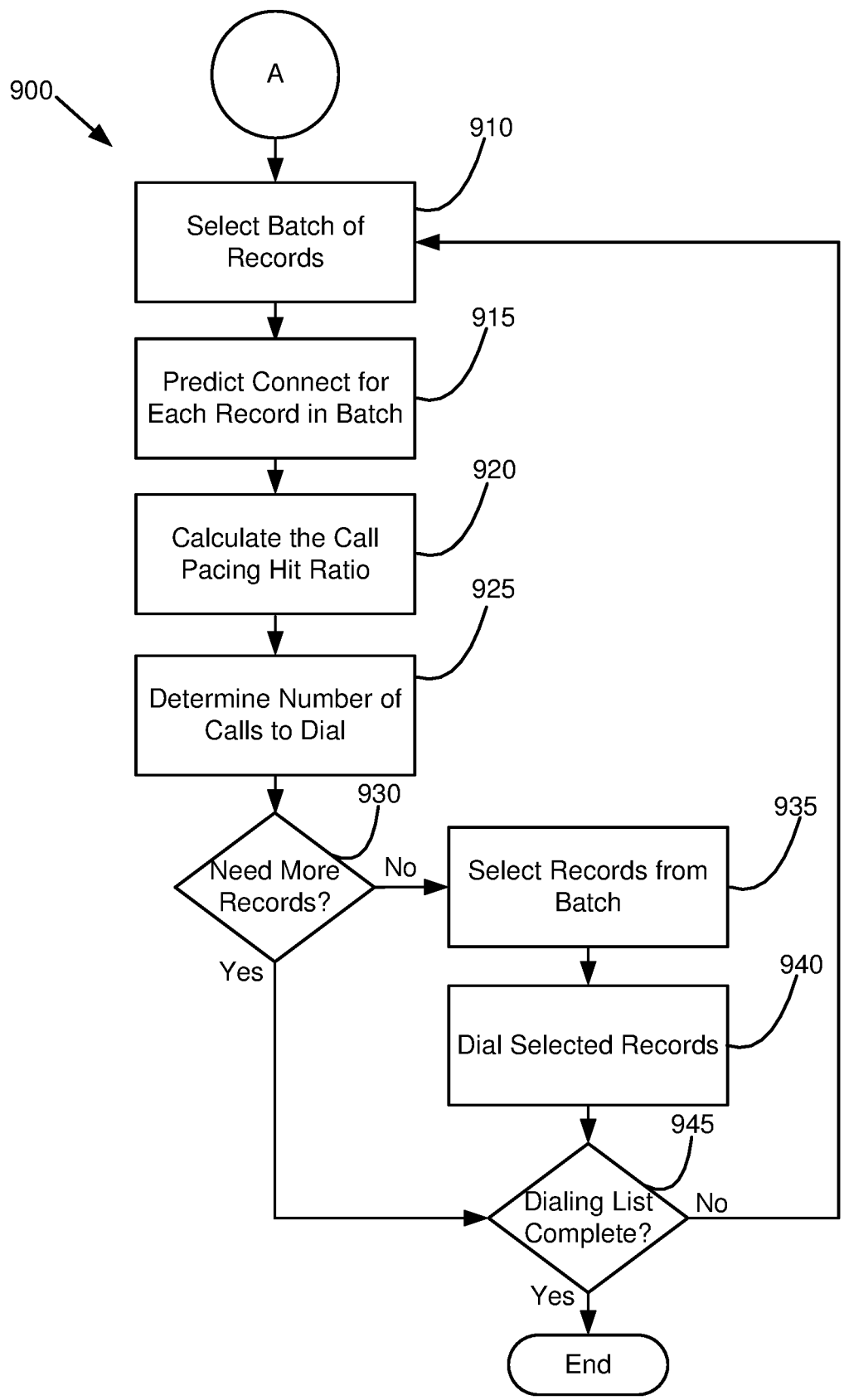
FIG. 9 illustrates an embodiment of a process flow for dialing a number of records in accordance with various technologies and concepts disclosed herein.

Turning now to FIGS. 8 and 9, additional details are provided regarding process flows that may be used in pacing outbound calls according to various embodiments of the invention. Specifically, FIGS. 8 and 9 are process flows carried out by a pacing module for performing such functionality according to various embodiments of the invention. For example, the process flows shown in FIGS. 8 and 9 may also correspond to operations carried out by a processor in a component, such as the predictive dialer 255 described above with respect to the call center architecture 200, as it executes the pacing module stored in the component's volatile and/or nonvolatile memory.

Accordingly, the process 800 shown in FIG. 8 begins with the pacing module retrieving a dialing record from a call list in Operation 810. Again, depending on the embodiment, the pacing module may retrieve the dialing record from a call list stored in some type of source such as, for example, a file or database. Furthermore, depending on the embodiment, the dialing record may include various types of information such as information on the individual(s) associated with the dialing record, as well as information on previous calls placed using the dialing record.

At this point, the pacing module determines whether the dialing record passes one or more filter criteria in Operation 815. Here, the filter criteria may be specific with respect to the type of outbound calling campaign being conducted and/or rules or regulations that the contact center must abided by while placing outbound calls. For example, the contact center may be conducting an outbound calling campaign for collections purposes. Accordingly, the contact center may need to ensure that an individual associated with a calling record providing a number for a mobile device for the individual has provided his permission to be contacted on the mobile device.

If the pacing module determines the dialing record passes the filter criteria, then the pacing module may predict the likelihood of making a right party contact for the dialing record in Operation 820. A right party contact (RPC) occurs when a call is placed to the dialing record and the intended party actually answers the call. Again, returning to the example involving the outbound calling campaign for collections purposes, a RPC is considered to occur when a call is placed to the individual's (who is associated with the debt to be collected) phone device and the individual actually answers the call instead of a service such as voice mail or a different individual answering the call. Accordingly, a RPC can be contingent on a number of different factors such as, for example, time of day the call is placed to the dialing record and/or the day of the week the call is placed. Thus, in particular embodiments, the "predicting" carried out by the pacing module may involve determining when the best time to place a call to the dialing record to ensure the highest probability of making a RPC, or the best two, three, four, etc. times to place a call to the dialing record to ensure highest probabilities of making a RPC. Upon predicting a RPC for the dialing record, the pacing module places the record on a dialing list in Operation 825. This dialing list is what is used by the predictive dialer in placing calls for the outbound calling campaign.

Next, the pacing module determines whether any more records remain on the call list in Operation 830. If so, then the pacing module returns to Operation 810 and retrieves the next dialing record from the call list. At this point, the pacing module repeats the operations described above for the newly selected record.

Once all of the dialing records have been processed from the call list, the pacing module sorts the dialing records in the dialing list in Operation 835. The sorting carried out by the pacing module sets the order in which the dialing records are retrieved from the dialing list and used to place calls for the outbound calling campaign. Accordingly, the pacing module in various embodiments is configured to use certain criteria in sorting the records found in the dialing list. For instance, in particular embodiments, the pacing module may be configured to sort the dialing records based on the best times to place a call to a particular dialing record to maximize the likelihood of making a RPC.

For example, the contact center may break down the outbound calling campaign into time periods such as hourly time periods (e.g., 9:00 am to 9:59 am, 10:00 am to 10:59 am, 11:00 am to 11:59 am, etc.) and the pacing module may determine a probability for making a RPC for each time period for each dialing record to be included on the list. Therefore, in Operation 835, the pacing module may sort the dialing records for each time period based on the probability of making a RPC during that time period. Thus, in this example, a sorted list is provided for each time period that includes each of the dialing records sorted based on the probability of making a RPC during that time period.

It is noted that in particular embodiments, the operations shown in FIG. 8 may not necessarily be carried out in conjunction with the operations to be discussed in FIG. 9. For instance, the operations shown in FIG. 8 may be carried out "off-line" and not in real-time as the outbound calling campaign is being conducted. Further, the operations shown in FIG. 8 may be carried out by some other component in particular embodiments besides the predictive dialer, such as, for example, the CTI server 245 shown in FIG. 2. Accordingly, in these particular embodiments, the operations may be carried out by some other module besides the pacing module such as, for example, a sorting module. However, with that said, a contact center may find it advantageous in some instances to carry out the operations shown in FIG. 8 in real-time in conjunction with the operations to be discussed in FIG. 9 so that that records to be dialed by the predictive dialer at any given time are ones more likely to result in a live connect with a RPC.

Turning now to FIG. 9, a process 900 is provided for the predictive dialer to make use of the dialing list during the outbound calling campaign according to various embodiments. Here, the process 900 begins with the pacing module selecting a batch of records from the dialing list in Operation 910. For instance, returning to the example in which the dialing list includes a sorted list for each time period (e.g., for each hour), the pacing module selects a set number of dialing records from the top of the sorting list for the appropriate hour.

At this point, the pacing module predicts whether a call placed to each selected dialing record is expected to result in a live connect in Operation 915 using the ensemble that includes the global and local neural networks. Accordingly, in particular embodiments, each prediction for a dialing record provides a probability of a call placed to the dialing record resulting in a live connect. Thus, in Operation 920, the pacing module calculates a cumulative call pacing hit ratio based on the probabilities for each of the dialing records found in the batch of selected records. For instance, in one embodiment, the pacing module calculates the call pacing hit ratio by averaging the probabilities across the dialing records and multiplying the average by the number of dialing records found in the batch of selected records.

Next, the pacing module determines the number of calls that need to be dialed in Operation 925. For instance, in particular embodiments, the pacing module determines the number of calls to be dialed based on the determined call pacing hit ratio and the number of agents who are available and/or the number of agents expected to become available within a time period (e.g., within the next five seconds). For example, if the determined call pacing hit ratio is 0.40 (40%) and the number of agents available and expected to become available equals fifty, then the pacing module determines one-hundred and twenty-five calls need to be dialed/placed to accommodate the number of agents who are available or about to become available. In addition, the pacing module may also consider a set target in determining the number of call to originate such as, for example, maintaining a particular abandonment rate, maintaining a time limit on how long a party should remain on hold before being connected to an agent, maintaining a maximum wait time agents should wait between calls, or a combination thereof.

Accordingly, the pacing module determines in Operation 930 whether additional records are needed than what are available in the current batch of selected dialing records based on the number of calls to originate as determined in Operation 925. If so, then the pacing module determines whether there are any more records remaining in the dialing list in Operation 945. If records are remaining, then the pacing module returns to Operation 910, selects additional records from the dialing list, and repeats the operations described above for the batch of records that now include newly selected records.

However, if the pacing module does not need any more records than are currently available in the batch of selected dialing records, then the pacing module selects the number of needed records from the batch in Operation 935. Accordingly, the pacing module then dials calls for the selected records in Operation 940. That is to say, the pacing module has the predictive dialer place virtually simultaneous calls to the entities (e.g., individuals) associated with the selected dialing records in Operation 940. Here, virtually simultaneous means the calls may not be all placed by the predictive dialer at the exactly same moment. However, the calls are all placed in close proximity to one another.

At this point, the pacing module determines whether any records remain on the dialing list or whether all of the dialing records have been selected from the dialing list in Operation 945. If not, then the pacing module returns to Operation 910 and begins the process 900 over again for determining the number of dialing records that need to be dialed and then dialing them. However, if instead all the records have been selected, then the pacing module ends the process 900.

Exemplary Computer Processing Device

Figure 10:
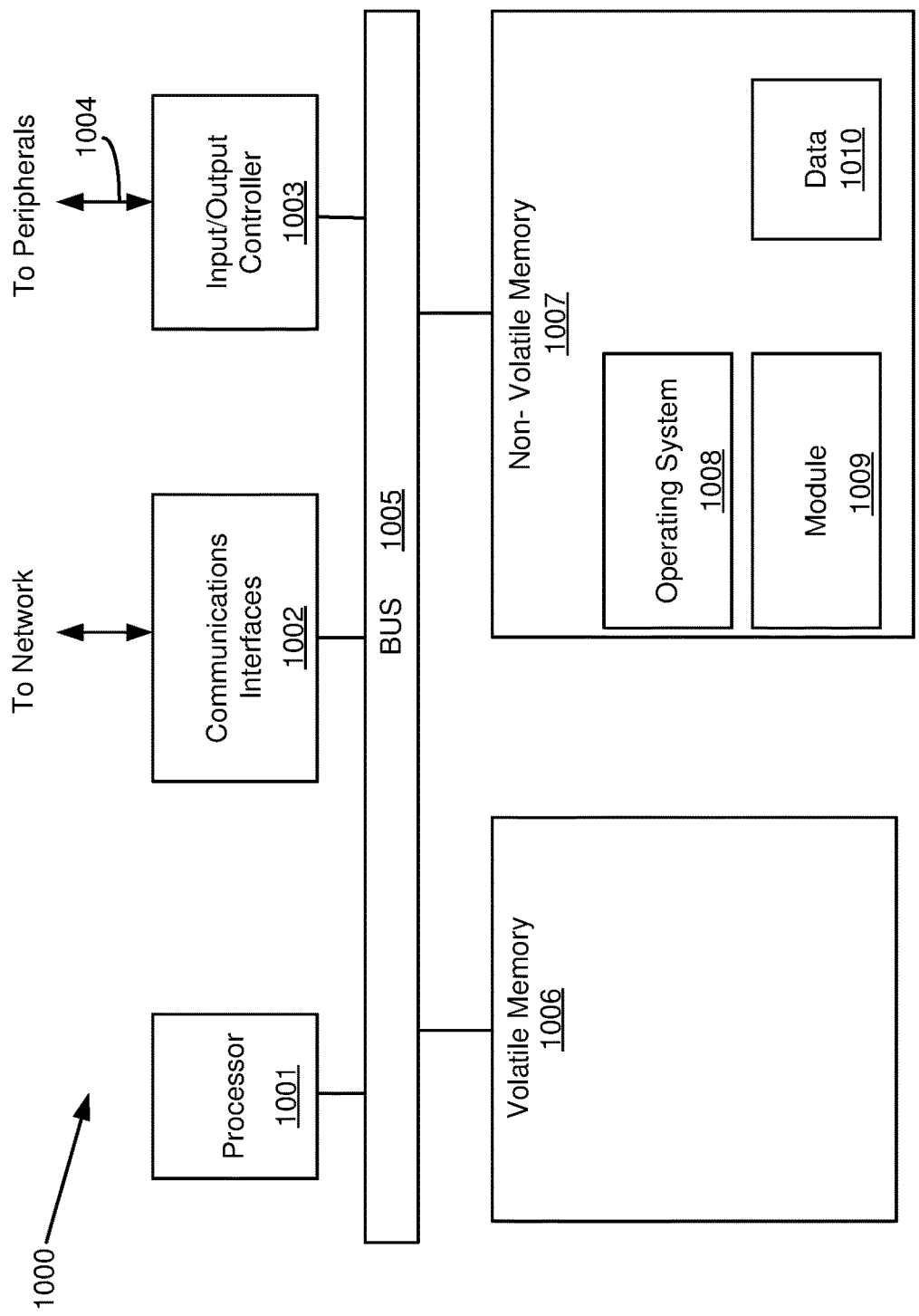
FIG. 10 illustrates an embodiment of a processing device for practicing various technologies and concepts disclosed herein.

FIG. 10 is an exemplary schematic diagram of a computer processing system that may be used in embodiments of various architectures, such as architecture 200 shown in FIG. 2, to practice the technologies disclosed herein. In general, the term "computer processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 10, the processing system 1000 may include one or more processors 1010 that may communicate with other elements within the processing system 1000 via a bus 1005. The processor 1001 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 1000 may also include one or more communications interfaces 1002 for communicating data via a network 270 with various external devices. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 1003 may also communicate with one or more input devices or peripherals using an interface such as, but not limited to: a keyboard, a mouse, a touch screen/display input, microphone, pointing device, etc. The input/output controller 1003 may also communicate with output devices or peripherals, such as displays, printers, speakers, headsets, banner displays, etc.

The processor 1001 may be configured to execute instructions stored in volatile memory 1006, non-volatile memory 1007, or other forms of computer readable storage media accessible to the processor 1001. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 1007 may store program code and data, which also may be loaded into the volatile memory 1006 at execution time. For example, the non-volatile memory 1007 may store one or more modules 1009 that may perform the above-mentioned process flows and/or operating system code 1008 containing instructions for performing the process and/or functions associated with the technologies disclosed herein. The module(s) 1009 may also access, generate, or store related data 1011, including, for example, the data described above in conjunction with determining call pacing hit ratios, in the non-volatile memory 1007, as well as in the volatile memory 1006. The volatile memory 1006 and/or non-volatile memory 1007 may be used to store other information including, but not limited to: records, applications, programs, scripts, source code, object code, byte code, compiled code, interpreted code, machine code, executable instructions, or the like. These may be executed or processed by, for example, the processor 1010 and may form a part of, or may interact with, the module(s) 1009.

The technologies described herein may be implemented in various ways, including as computer program products comprising memory storing instructions causing a processor to perform the operations associated with the above technologies. The computer program product may comprise a non-transitory (tangible) computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory, propagating signal, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-Ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for pacing outbound calls placed by a predictive dialer in a contact center, comprising the steps of:
applying an ensemble by the predictive dialer to each dialing record found in a plurality of dialing records to provide a probability of an outbound call placed to the dialing record resulting in a live connect, wherein the ensemble comprises a global predictive model representing comprehensive dialing trends across at least one of multiple industries, multiple purposes, multiple locations, and multiple predictive dialers and a local predictive model representing a specific dialing history associated with the contact center;
calculating by the predictive dialer a call pacing hit ratio based on the probability for each dialing record in the plurality of dialing records, the call pacing hit ratio representing a percentage of outbound calls expected to result in a live connect;
determining a number of outbound calls to place by the predictive dialer based on the call pacing hit ratio and at least one of a number of agents associated with the contact center that are currently available to handle calls and a number of agents associated with the contact center that are expected to become available to handle calls within a time period;
selecting a set of dialing records from the plurality of dialing records by the predictive dialer based on the number of outbound calls to place; and
placing virtually simultaneous outbound calls by the predictive dialer for each of the dialing records found in the set of dialing records.

2. The method of claim 1, wherein determining the number of outbound calls to place by the predictive dialer is also based on a set target comprising at least one of: maintaining an abandonment rate; maintaining a time limit on how long a party can remain on hold before being connected with an agent; and maintaining a maximum wait time an agent can wait between calls.

3. The method of claim 1, wherein the ensemble comprises a logistic regression model based on combining the global predictive model and the local predictive model.

4. The method of claim 3, wherein the global predictive model and the local predictive model are both neural networks.

5. The method of claim 1, wherein the predictive dialer calculates the call pacing hit ratio by calculating an average for the probabilities across the plurality of dialing records and multiplying the average by a number of dialing records found in the plurality of dialing records.

6. The method of claim 1, wherein the plurality of dialing records are sorted based on a likelihood of making a right party contact by placing an outbound call to each of the dialing records found in the plurality of dialing records.

7. A non-transitory, computer-readable storage medium comprising computer-executable instructions for pacing outbound calls placed by a predictive dialer in a contact center that when executed by the predictive dialer are configured to cause the predictive dialer to:
apply an ensemble to each dialing record found in a plurality of dialing records to provide a probability of an outbound call placed to the dialing record resulting in a live connect, wherein the ensemble comprises a global predictive model representing comprehensive dialing trends across at least one of multiple industries, multiple purposes, multiple locations, and multiple predictive dialers and a local predictive model representing a specific dialing history associated with the contact center;
calculate a call pacing hit ratio based on the probability for each dialing record in the plurality of dialing records, the call pacing hit ratio representing a percent of outbound calls expected to result in a live connect;
determine a number of outbound calls to place based on the call pacing hit ratio and at least one of a number of agents associated with the contact center that are currently available to handle calls and a number of agents associated with the contact center that are expected to become available to handle calls within a time period;
select a set of dialing records from the plurality of dialing records based on the number of outbound calls to place; and
place virtually simultaneous outbound calls for each of the dialing records found in the set of dialing records.

8. The non-transitory, computer-readable storage medium of claim 7, wherein the computer-executable instructions cause the predictive dialer to determine the number of outbound calls to place based also on a set target comprising at least one of: maintaining an abandonment rate; maintaining a time limit on how long a party can remain on hold before being connected with an agent; and maintaining a maximum wait time an agent can wait between calls.

9. The non-transitory, computer-readable storage medium of claim 7, wherein the ensemble comprises a logistic regression model based on combining the global predictive model and the local predictive model.

10. The non-transitory, computer-readable storage medium of claim 9, wherein the global predictive model and the local predictive model are both neural networks.

11. The non-transitory, computer-readable storage medium of claim 7, wherein the computer-executable instructions cause the predictive dialer to calculate the call pacing hit ratio by calculating an average for the probabilities across the plurality of dialing records and multiplying the average by a number of dialing records found in the plurality of dialing records.

12. The non-transitory, computer-readable storage medium of claim 7, wherein the plurality of dialing records are sorted based on a likelihood of making a right party contact by placing an outbound call to each of the dialing records found in the plurality of dialing records.

13. A system for pacing outbound calls in a contact center, the system comprising:
a predictive dialer configured to:

apply an ensemble to each dialing record found in a plurality of dialing records to provide a probability of an outbound call placed to the dialing record resulting in a live connect, wherein the ensemble comprises a global predictive model representing comprehensive dialing trends across at least one of multiple industries, multiple purposes, multiple locations, and multiple predictive dialers and a local predictive model representing a specific dialing history associated with the contact center;

calculate a call pacing hit ratio based on the probability for each dialing record in the plurality of dialing records, the call pacing hit ratio representing a percent of outbound calls expected to result in a live connect;

determine a number of outbound calls to place based on the call pacing hit ratio and at least one of a number of agents associated with the contact center that are currently available to handle calls and a number of agents associated with the contact center that are expected to become available to handle calls within a time period;

select a set of dialing records from the plurality of dialing records based on the number of outbound calls to place; and place virtually simultaneous outbound calls for each of the dialing records found in the set of dialing records.

14. The system of claim 13, wherein the predictive dialer is configured to determine the number of outbound calls to place based also on a set target comprising at least one of: maintaining an abandonment rate; maintaining a time limit on how long a party can remain on hold before being connected with an agent; and maintaining a maximum wait time an agent can wait between calls.

15. The system of claim 13, wherein the ensemble comprises a logistic regression model based on combining the global predictive model and the local predictive model.

16. The system of claim 15, wherein the global predictive model and the local predictive model are both neural networks.

17. The system of claim 13, wherein the predictive dialer is configured to calculate the call pacing hit ratio by calculating an average for the probabilities across the plurality of dialing records and multiplying the average by a number of dialing records found in the plurality of dialing records.

18. The system of claim 13, wherein the plurality of dialing records are sorted based on a likelihood of making a right party contact by placing an outbound call to each of the dialing records found in the plurality of dialing records.

* * * * *